(12) United States Patent
Kamoi

(10) Patent No.: US 12,260,132 B2
(45) Date of Patent: Mar. 25, 2025

(54) PRINTING SYSTEM AND METHOD

(71) Applicant: CANON KABUSHIKI KAISHA, Tokyo (JP)

(72) Inventor: Keiko Kamoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/053,689

(22) Filed: Nov. 8, 2022

(65) Prior Publication Data

US 2023/0153039 A1 May 18, 2023

(30) Foreign Application Priority Data

Nov. 12, 2021 (JP) ................................. 2021-184541

(51) Int. Cl.
*G06F 3/12* (2006.01)

(52) U.S. Cl.
CPC ............ *G06F 3/1203* (2013.01); *G06F 3/126* (2013.01); *G06F 3/1274* (2013.01); *G06F 3/1288* (2013.01)

(58) Field of Classification Search
CPC ...... G06F 3/1203; G06F 3/126; G06F 3/1274; G06F 3/1288; G06F 3/1204; G06F 3/1205; G06F 3/1222; G06F 3/1238; G06F 3/1267

See application file for complete search history.

(56) References Cited

U.S. PATENT DOCUMENTS

| | | | |
|---|---|---|---|
| 2013/0100480 A1* | 4/2013 | Ikeda | G06K 15/405 358/1.14 |
| 2013/0163027 A1* | 6/2013 | Shustef | H04L 63/0209 358/1.14 |
| 2014/0036296 A1* | 2/2014 | Armstrong | G06F 3/1208 358/1.14 |
| 2016/0224279 A1* | 8/2016 | Kim | G06F 3/1229 |
| 2020/0364010 A1* | 11/2020 | Inoue | G06F 3/1259 |
| 2021/0042074 A1* | 2/2021 | Udo | G06F 3/1206 |
| 2021/0055893 A1* | 2/2021 | Saigusa | G06F 3/1205 |
| 2021/0132886 A1* | 5/2021 | Inoue | G06F 3/1207 |

FOREIGN PATENT DOCUMENTS

JP   2012133489 A   7/2012

* cited by examiner

*Primary Examiner* — Huo Long Chen
(74) *Attorney, Agent, or Firm* — Canon U.S.A., Inc. IP Division

(57) ABSTRACT

A first printing system configured to cooperate with a second printing system includes a first reception unit configured to receive a first request relating to printing from a first printing apparatus, a first transmission unit configured to transmit, to the first printing apparatus, print data corresponding to a user that is an issuer of the first request, a second reception unit configured to receive a second request relating to printing from a client terminal based on acquisition of configuration information about a second printing apparatus which is to be a printing target on the client terminal, and a second transmission unit configured to transmit, to the second printing system managing the second printing apparatus, print data corresponding to a user that is an issuer of the second request so that the second printing apparatus specified by the configuration information prints the print data.

18 Claims, 17 Drawing Sheets

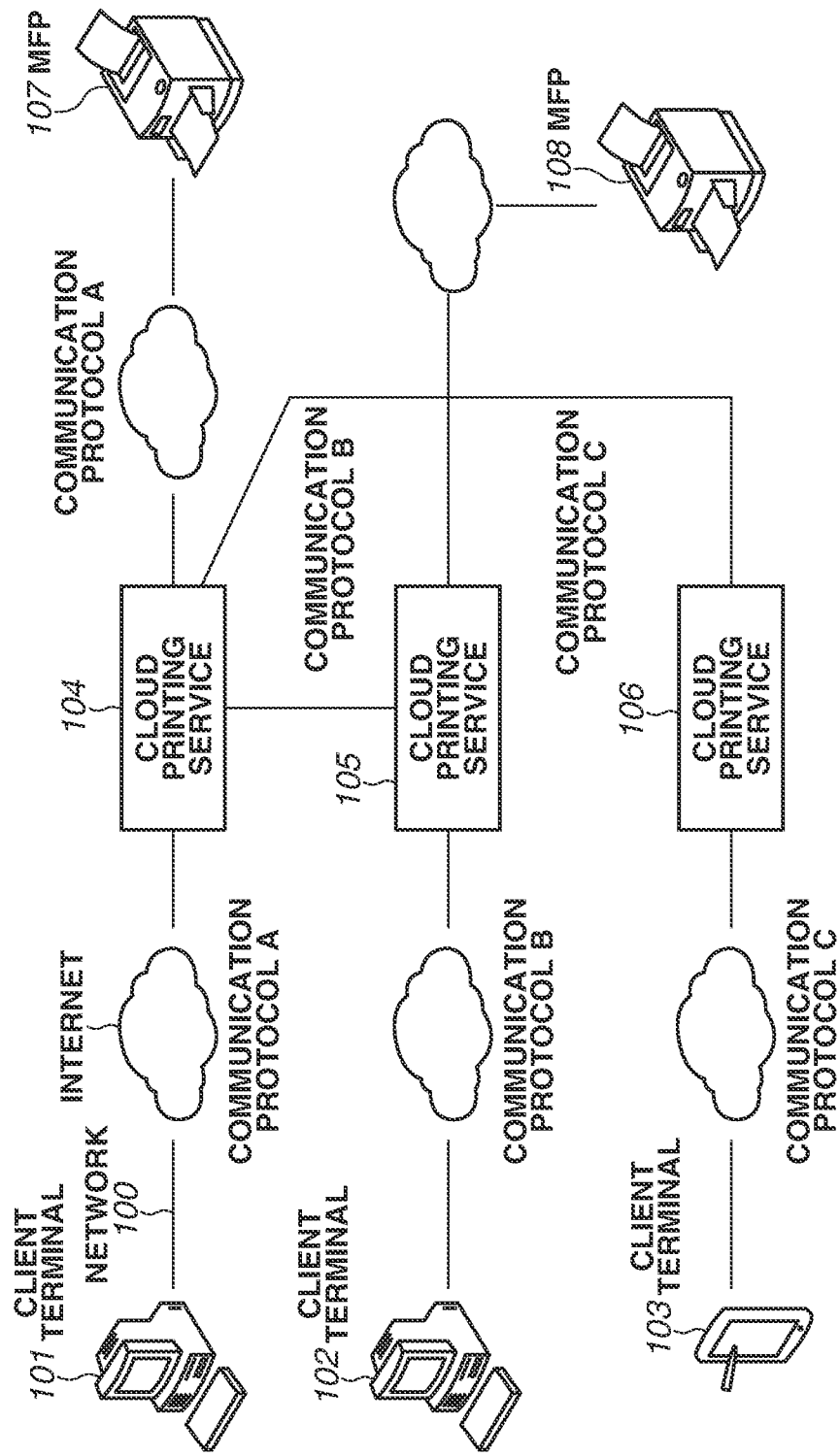

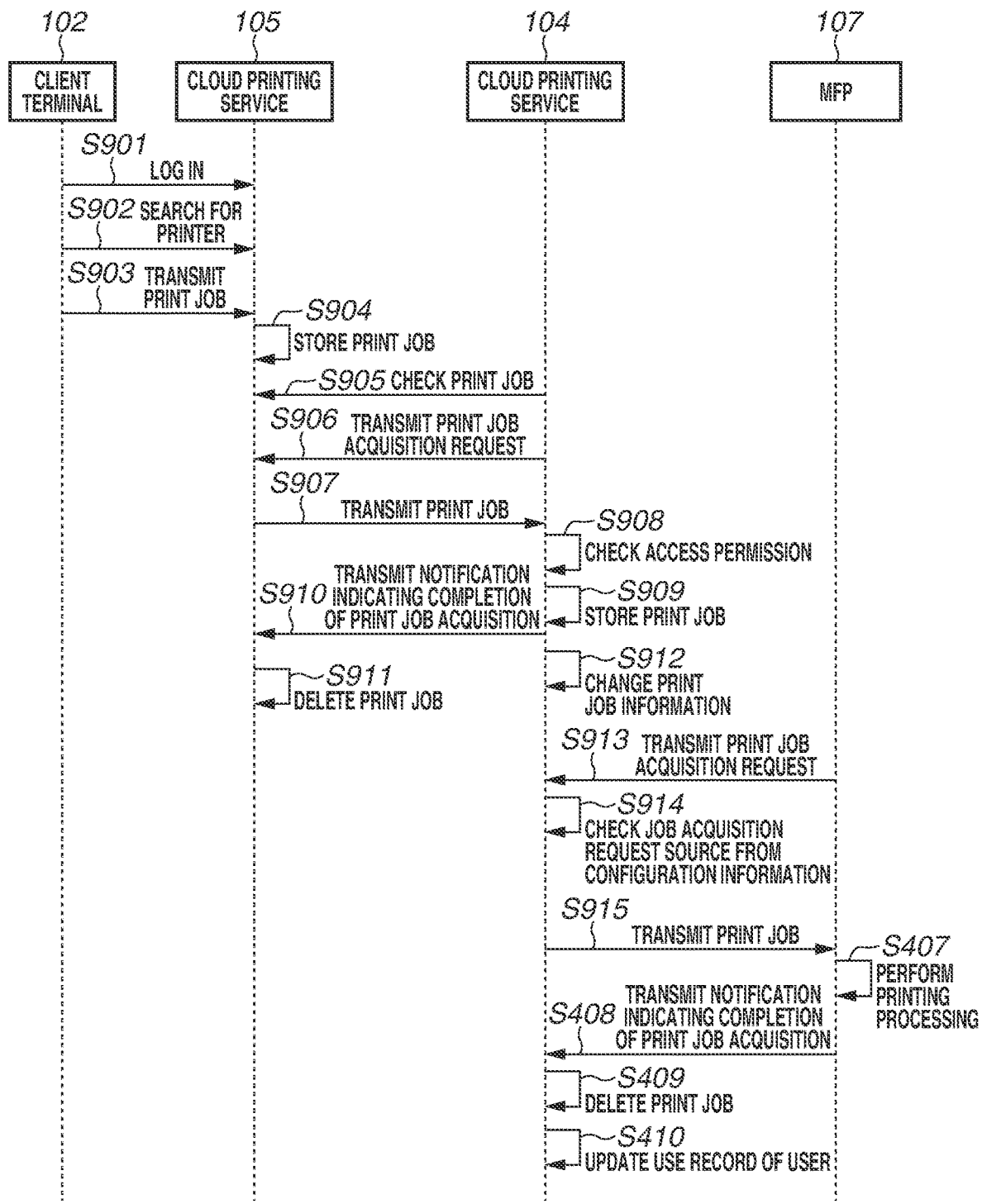

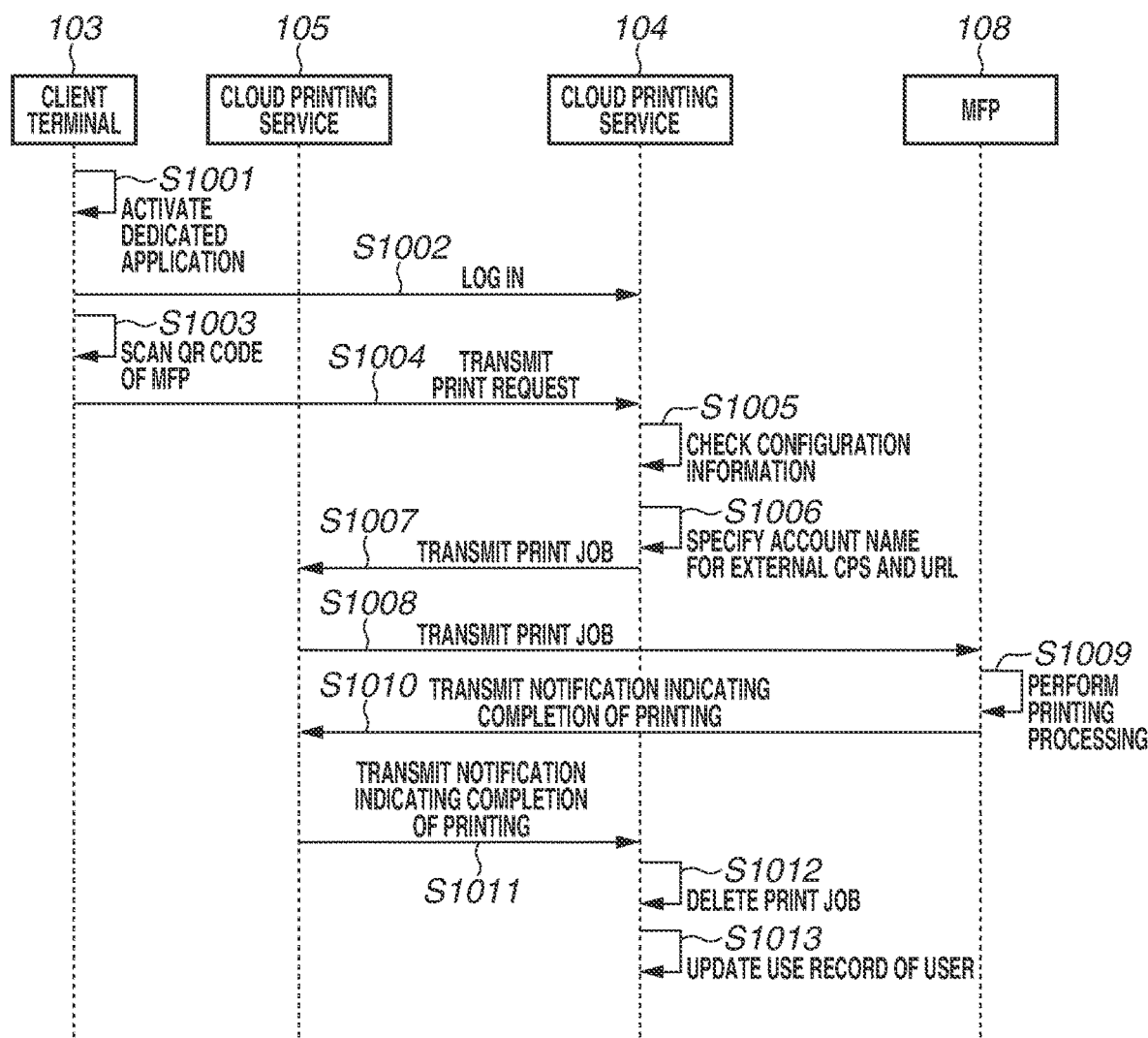

PRINT JOB ATTRIBUTES IN CPS 105
COMMUNICATION PROTOCOL: IPP
Job-name:data1
Requesting-user-name:aaaAlice@companyA.example1.jp
Copies: 1
Print-color-mode: auto
Document-format: PDF

---

1102

PRINT JOB ATTRIBUTES IN CPS 104
COMMUNICATION PROTOCOL: HTTP
HTTP-Job-name:data1
HTTP-Requesting-user-name:aaaAlice@companyA.example1.jp
HTTP-Copies: 1
HTTP-Print-color-mode: auto
HTTP-Document-format: PDF

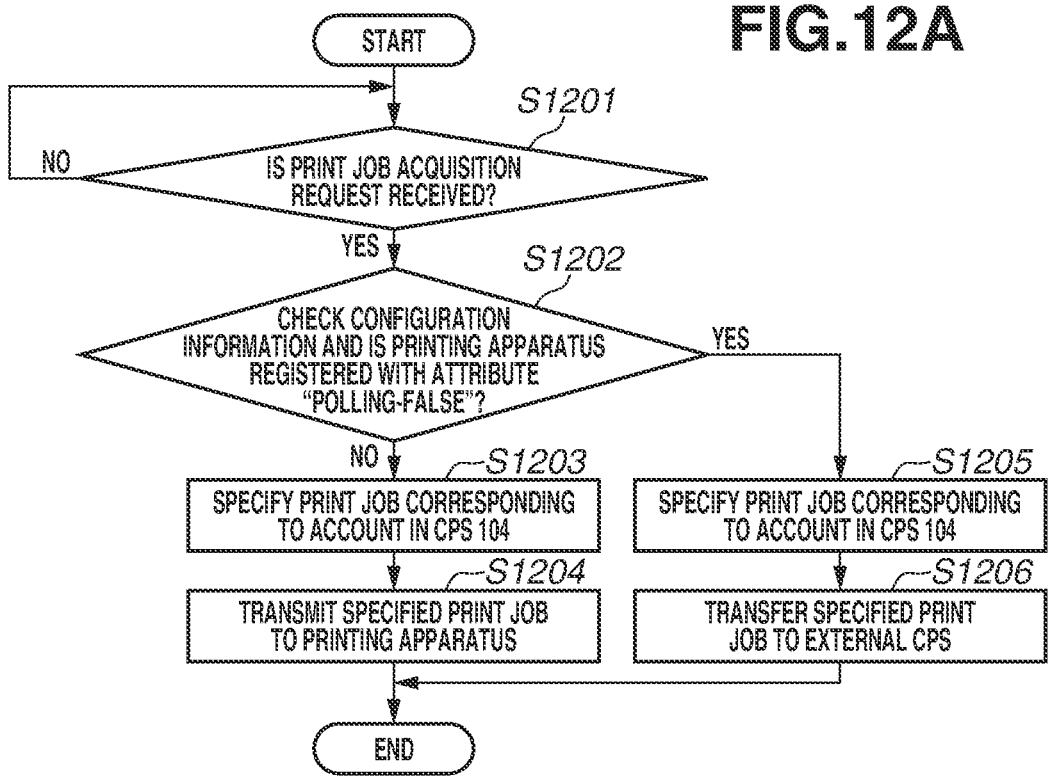
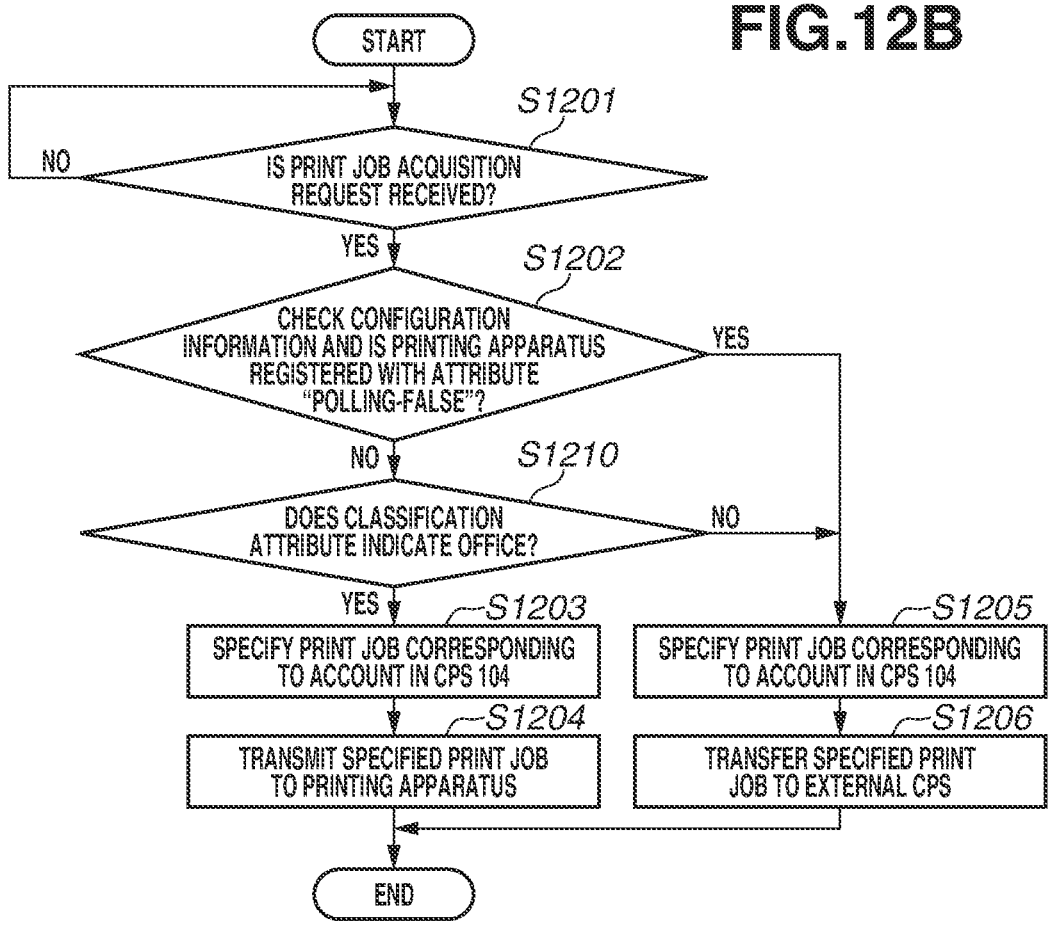

PRINTING SYSTEM AND METHOD

BACKGROUND

Field of the Disclosure

The present disclosure relates to a printing service provided using a cloud computing technique.

Description of the Related Art

Cloud printing services that receive print jobs input via the cloud and transmit the print jobs to printing apparatuses are increasingly used in recent years (Japanese Patent Application Laid-Open No. 2012-133489). In this printing system, first, an administrator registers information about a printing apparatus in a cloud printing service to which the administrator belongs.

Then, the administrator sets a setting to permit or not permit a user to use the printing apparatus. A user permitted to use the printing apparatus inputs a print job from a client terminal to the cloud printing service. The cloud printing service stores the received print job in a storage. The printing apparatus acquires the print job stored in the cloud printing service and performs printing. Examples of cloud printing services are Google Cloud Print®, Microsoft Hybrid Cloud Print®, and uniFLOW Online®.

In enterprise environments, client terminals of a plurality of operating system (OS) vendors are used (e.g., Windows® OS, macOS®, Chrome® OS). Further, cloud platforms are increasingly used in recent years, and there are an increasing number of cases where a single enterprise uses a plurality of different cloud platforms (e.g., Amazon Web Services (AWS), Azure, Google Cloud Platform). Further, there are also an increasing number of cases where each cloud platform provides a cloud printing service to a user of the cloud platform to enable the user to print with ease. In the foregoing cases, there is a plurality of cloud printing services (e.g., cloud printing services A to C). In a case where there is a plurality of cloud printing services, it takes time for the administrator to register the information about the printing apparatus in the plurality of cloud printing services and to perform maintenance operations.

In order for the printing apparatus to support the plurality of cloud printing services in the foregoing environment, the printing apparatus needs to include a communication function and a control function for appropriately receiving print jobs from the cloud printing services.

However, printing from a specific cloud printing service may not be supported depending on the time of sale of the printing apparatus or due to a difference in manufacturer of the printing apparatus. Furthermore, the printing apparatus may not be supported by the specific cloud printing service due to part or capability of hardware needed for the target printing service or functionalities provided by software.

There has been an issue that the foregoing printing apparatus cannot be used from a specific cloud printing service.

SUMMARY

Embodiments of the present disclosure are directed to providing a method by which a printing apparatus realizes printing flexibly through cooperation with another cloud printing service using a special printing method for a specific cloud printing service.

According to embodiments of the present disclosure, a first printing system configured to cooperate with a second printing system includes a storage configured to manage print data for each user, a first reception unit configured to receive a first request relating to printing from a first printing apparatus, a first transmission unit configured to transmit, to the first printing apparatus, print data corresponding to a user that is an issuer of the first request so that the first printing apparatus prints the print data, a second reception unit configured to receive a second request relating to printing from a client terminal based on acquisition of configuration information about a second printing apparatus which is to be a printing target on the client terminal, and a second transmission unit configured to transmit, to the second printing system managing the second printing apparatus, print data corresponding to a user that is an issuer of the second request so that the second printing apparatus specified by the configuration information prints the print data.

Further features of the present disclosure will become apparent from the following description of exemplary embodiments with reference to the attached drawings.

BRIEF DESCRIPTION OF THE DRAWINGS

FIG. 1 is a diagram illustrating an example of a printing system.

FIG. 9 is a sequence diagram illustrating an example of a printing process in a case where a multi-function peripheral (MFP) performs printing.

FIG. 10 is a sequence diagram illustrating an example of a printing process in a case where another MFP performs printing.

FIG. 11 is a diagram illustrating an example of attribute information included in a print job.

FIGS. 12A and 12B are flowcharts illustrating a process relating to control of printing by a CPS.

DESCRIPTION OF THE EMBODIMENTS

Figure 2A:
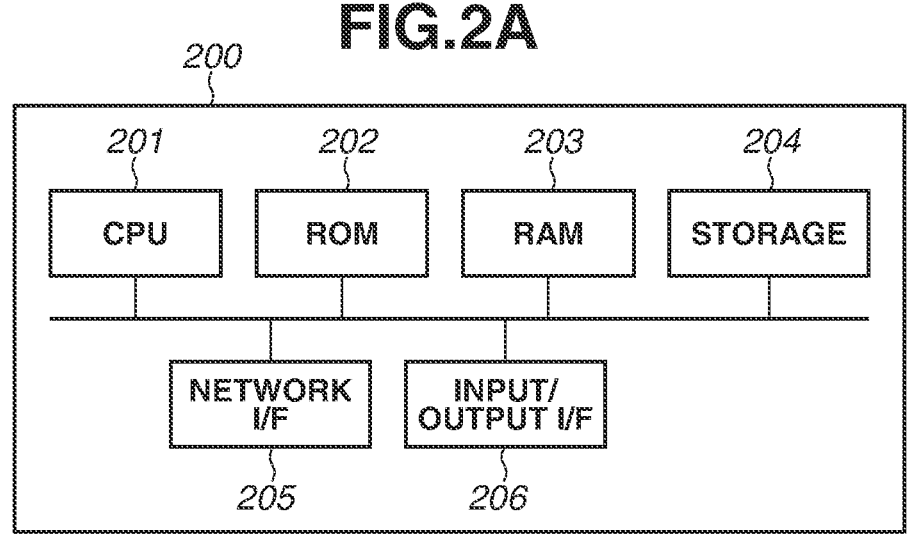
FIGS. 2A and 2B are diagrams illustrating an example of a hardware configuration of an apparatus according to an aspect of the present disclosure.

Various exemplary embodiments of the present disclosure will be described below with reference to the drawings. It should be noted that the below-described exemplary embodiments are not intended to limit the scope of the disclosure and that not all combinations of features described in the exemplary embodiments are always essential to a technical solution provided by the present disclosure.

A first exemplary embodiment will be described below. First, a configuration of a printing system according to the present exemplary embodiment will be described below with reference to FIG. 1.

The printing system according to the present exemplary embodiment includes multi-function peripherals (MFPs) 107 and 108, client terminals 101 to 103, and cloud printing services (hereinafter, also referred to as "CPS") 104 to 106. While the client terminals 101 to 103 are described as a personal computer (PC) or a mobile terminal, the client terminals 101 to 103 are not limited to PCs or mobile terminals.

The MFPs 107 and 108 include a scan function of externally transmitting data based on an image acquired by scanning using a scanner, a print function of printing an image on a sheet such as paper based on a print job received from an external apparatus, and a copy function. Further, the MFPs 107 and 108 can receive print jobs via supported cloud printing services and perform printing. While MFPs including a plurality of functions are described as examples of printing apparatuses according to the present exemplary embodiment, the printing apparatuses are not limited to MFPs. For example, a single function peripheral (SFP) including only a print function can be used. Further, while printing on a sheet such as paper is described as an example according to the present exemplary embodiment, aspects of the present disclosure are not limited to the foregoing printing and are also applicable to control of three-dimensional (3D) printing for forming a 3D object based on 3D shape data.

In an intended operation form of the printing system according to the present exemplary embodiment, a plurality of different CPSs outputs printed materials using the MFP 107 as a printing apparatus.

To realize such an operation form with a conventional technique, the printing apparatus needs to support the plurality of cloud printing services. The conventional form in which a printing apparatus supports each printing service has an issue that an old printing apparatus cannot be used from a new cloud printing service. Furthermore, there are other issues that it takes time for an administrator to perform registration and maintenance operations and that centralized management is difficult. For example, in a case where cost information and statistical data are managed by a plurality of cloud services, a process of checking by the administrator becomes complicated.

Furthermore, printing not intended by the administrator may be performed due to an error in access control settings.

In consideration of at least one of the above-described issues, the printing system according to the present exemplary embodiment provides control for improving usability of the printing system in using a plurality of CPSs. A specific system will be described below.

Referring back to FIG. 1, the CPS 104 is a cloud printing service configured to receive print jobs from the client terminal 101 and to acquire print jobs stored in the external CPSs 105 and 106, each implemented by a different printing system.

The CPSs 105 and 106 are services on a network that respectively receive print jobs from the client terminals 102 and 103 and store the received print jobs. The CPS 104 is a first cloud printing service provided to users of a tenant "companyA.example0.jp". Further, the external CPS 105 is intended to be a second cloud printing service provided to users of a tenant "companyA.example1.jp". The external CPS 106 is intended to be a third cloud printing service provided to users of a tenant "companyA.example2.jp". According to the present exemplary embodiment, the CPSs 104 to 106 are different types of cloud printing services provided by different service providers.

The CPSs 104 to 106 perform communication for printing using different communication protocols A to C, respectively. The MFP 107 acquires a print job stored in the CPS 104 and performs printing. Further, the MFP 108 can receive a print job transmitted from the CPS 105 and perform printing.

The foregoing apparatuses are communicably connected to each other via a network 100. The network 100 can be, for example, a combination of a communication network such as a local area network (LAN) or a wide area network (WAN), a public wireless communication network (e.g., Long Term Evolution (LTE), 5G), and an Institute of Electrical and Electronics Engineers (IEEE) 802.11 wireless network. Specifically, the network 100 is to be at least capable of transmitting and receiving data, and any methods can be used as a communication method of a physical layer.

Hardware Configuration

FIG. 2A is a block diagram illustrating a hardware configuration of a server 200. The server 200 is a real resource that forms the printing system providing the CPSs 104 to 106 illustrated in FIG. 1.

A central processing unit (CPU) 201 cooperates with other components and controls operations of the server 200. The CPU 201 reads an operating system (OS) or a control program stored in a read-only memory (ROM) 202 or a storage 204 and executes the read OS or the read control program. The ROM 202 stores control programs that are executable by the CPU 201. A random access memory (RAM) 203 is a main storage memory of the CPU 201 and is used as a work area or a temporary storage area for loading various control programs. The storage 204 stores print data, image data, various programs, and various types of setting information. While the storage 204 is intended to be an auxiliary storage device such as a hard disk drive (HDD) according to the present exemplary embodiment, a non-volatile memory such as a solid state drive (SSD) can be used as the storage 204 instead of an HDD. As described above, the hardware components such as the CPU 201, the ROM 202, and the RAM 203 form a so-called computer. The server 200 can further include an application-specific integrated circuit (ASIC) for rendering print data.

While a case where one CPU 201 performs processes illustrated in flowcharts described below using one memory (the RAM 203) will be described below as an example according to the present exemplary embodiment, any other forms can be used. For example, a plurality of processors, a plurality of RAMs, a plurality of ROMs, and a plurality of storages can cooperate together to perform the processes illustrated in the below-described flowcharts. Further, the processes can be performed using a plurality of server computers. The server 200 can provide the first cloud printing service to a plurality of different tenants using containerization or virtualization techniques. Specifically, the CPSs 104 to 106 are services that are realized using a hardware resource of one or more servers.

A network interface (I/F) 205 is an interface for performing external network communication. The server 200 is connected to the network 100 via the network I/F 205. An input/output I/F 206 is an interface for connecting input devices and output devices such as a keyboard, a mouse, and a display. The input devices and the output devices connected to the input/output I/F 206 are used in performing maintenance operations on the real server providing the cloud service.

Figure 2B:
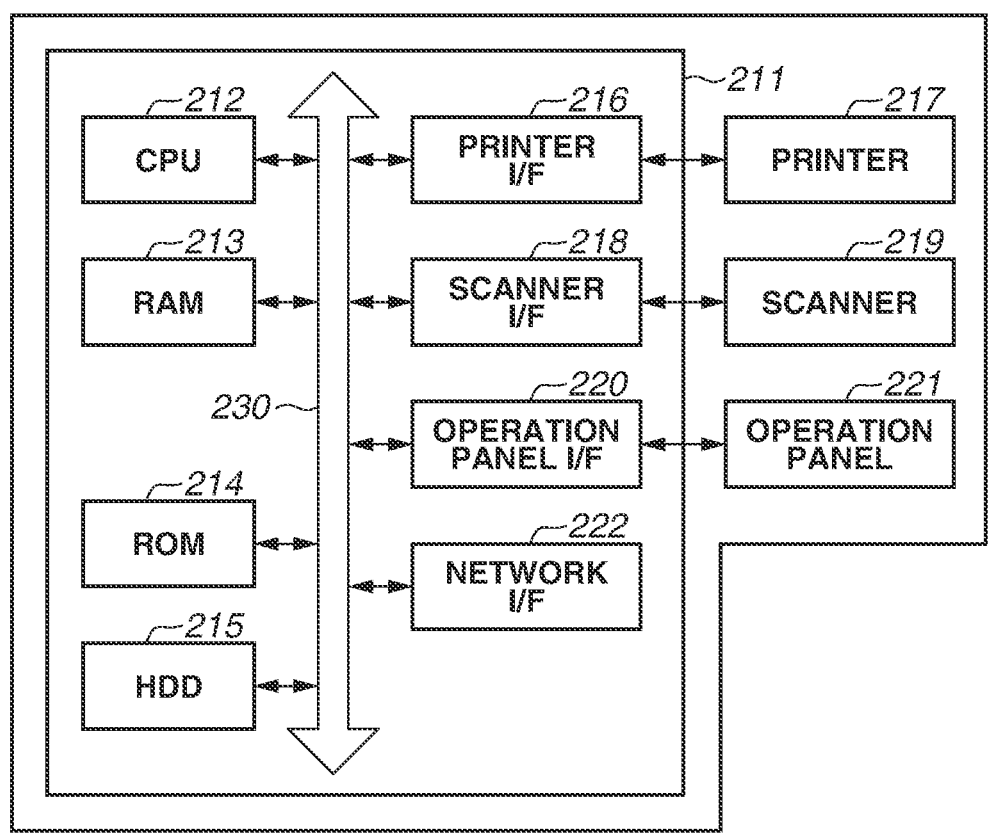

FIG. 2B is a block diagram illustrating an example of a hardware configuration of the MFPs 107 and 108 illustrated in FIG. 1.

A control unit 211 including a CPU 212 controls operations of the entire MFP 107. The CPU 212 reads a control program stored in a ROM 214 and performs various types of control such as communication control. A RAM 213 is used as a main memory of the CPU 212 and a temporary storage area such as a work area. A HDD 215 stores data, various programs, or various information tables. The programs that are stored in the MFP 107, read to a memory, and executed by the CPU 212 include programs for implementing processes illustrated in sequences described below.

A printer interface I/F 216 operates as an interface for outputting image signals to a printer 217 (printer engine). Further, a scanner I/F 218 operates as an interface for inputting read image signals from a scanner 219 (scanner engine). The CPU 212 processes image signals input from the scanner I/F 218 and outputs the processed image signals as recording image signals to the printer I/F 216. An operation panel I/F 220 connects an operation panel 221 and the control unit 211 together. The operation panel 221 includes a liquid crystal display unit including a touch panel function and a keyboard. A network I/F 222 transmits information externally, e.g., the CPS 104, or receives various types of information and print jobs from external apparatuses. Blocks in the control unit 211 are connected together via a system bus 230.

Software Configuration

Figure 3:
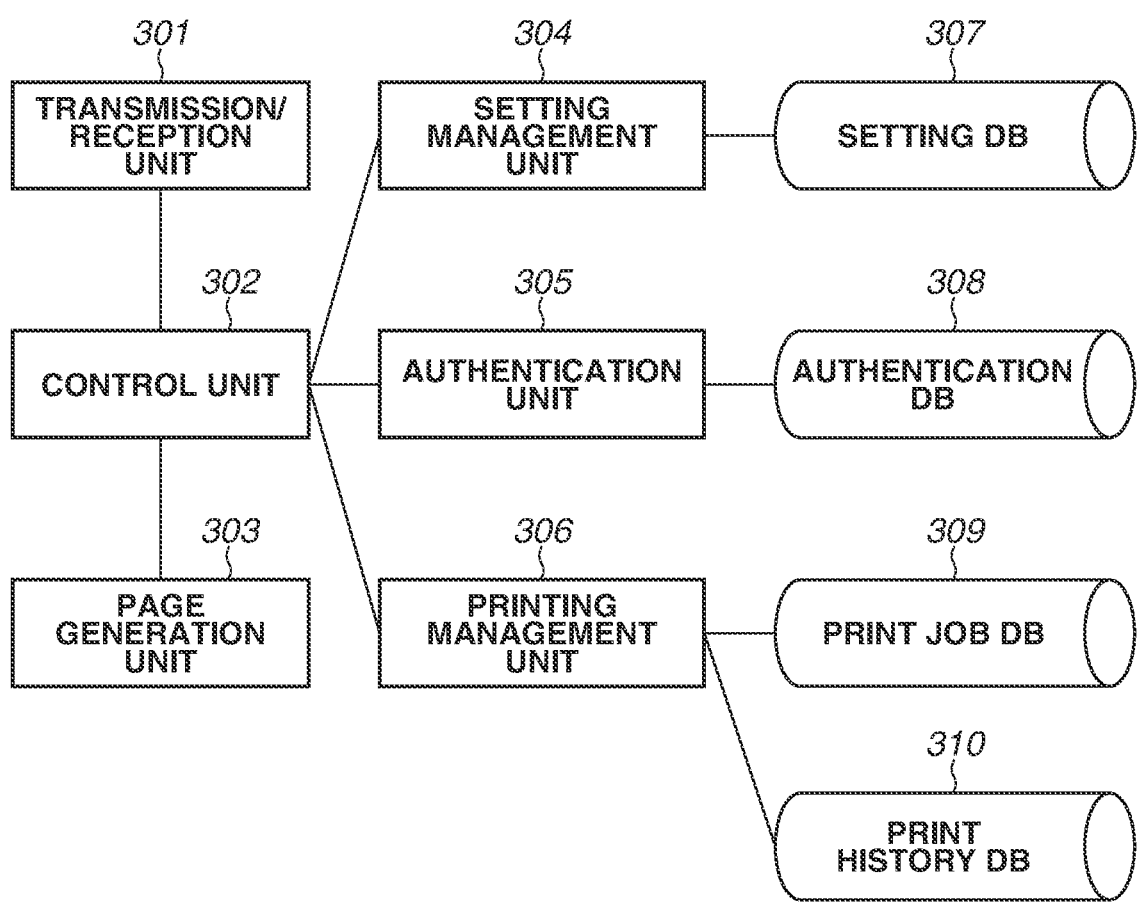
FIG. 3 is a diagram illustrating an example of a software configuration of a cloud printing service (CPS).

FIG. 3 is a diagram illustrating a configuration of software modules that run on the CPS 104. The software modules are stored in the storage 204 illustrated in FIG. 2, and the CPU 201 loads the software modules to the RAM 203 and executes the loaded software modules.

A transmission/reception unit 301 communicates with web browsers and print clients of the client terminal 101 and the MFP 107 via the network I/F 205. A control unit 302 performs processing based on requests received by the transmission/reception unit 301. A page generation unit 303 generates a web page to return a response to the web browsers. A setting management unit 304 stores various types of setting information about the CPS 104, information about cooperating external CPS s, and information about MFPs registered in the CPS 104 in a setting database (DB) 307 and controls the stored information. An authentication unit 305 authenticates a user having issued a login request to the CPS 104 and requests an external CPS to authenticate the user using an authentication DB 308 storing information about users belonging to the tenants. A printing management unit 306 controls storage of print jobs received from the client terminal 101 and print jobs acquired from the external CPSs in a print job DB 309 as a storage and performs image processing such as rendering on the print jobs. The rendering can be performed in cooperation with another hardware component. Further, the printing management unit 306 gathers use records of users and use statuses relating to printing, such as the number of prints per month, and stores the gathered use records and the gathered use statuses in a print history DB 310.

According to the present exemplary embodiment, a CPS supporting a multi-tenant architecture that executes modules of an application layer using a shared module and manages databases managing user-specific data for each tenant separately is implemented. Aspects of the present disclosure are not limited to such a case. Any methods for implementing a multi-tenant architecture can be used. The CPSs 105 and 106 have similar software configurations for providing the printing services.

Process of Registering Printer in CPS 104

Figure 4A:
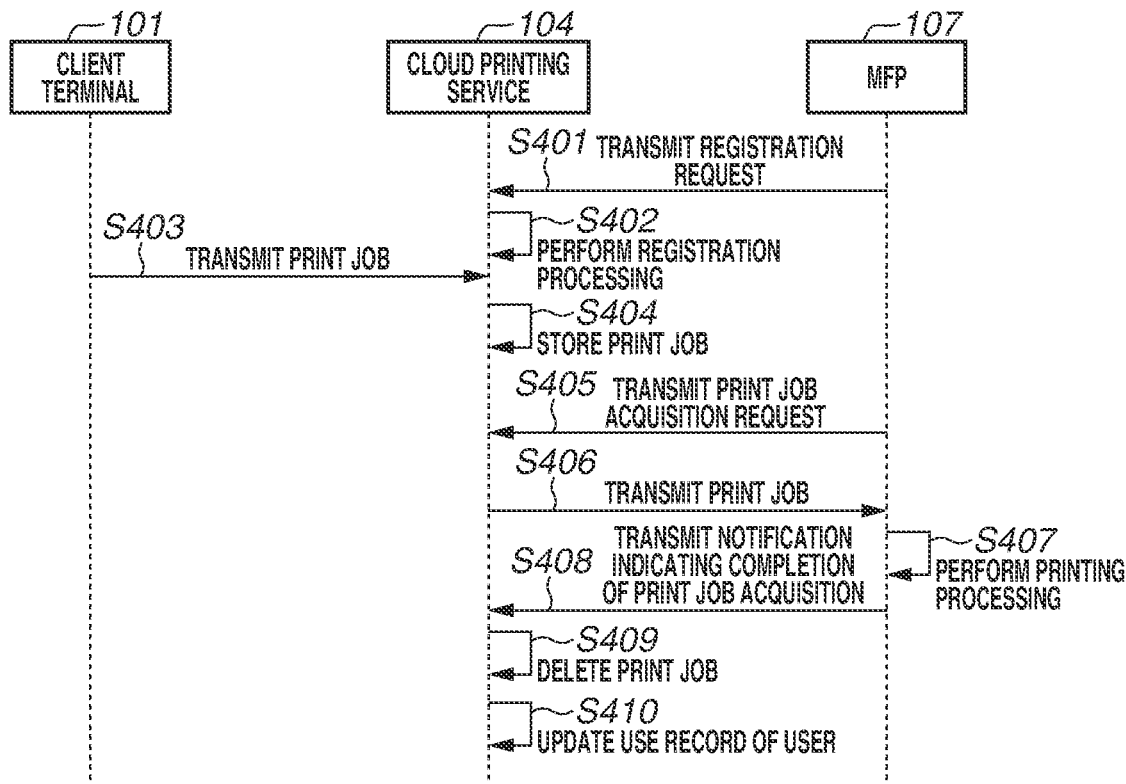
FIGS. 4A and 4B are sequence diagrams illustrating an example of a process of registering a printer in a CPS and performing printing.
Figure 4B:
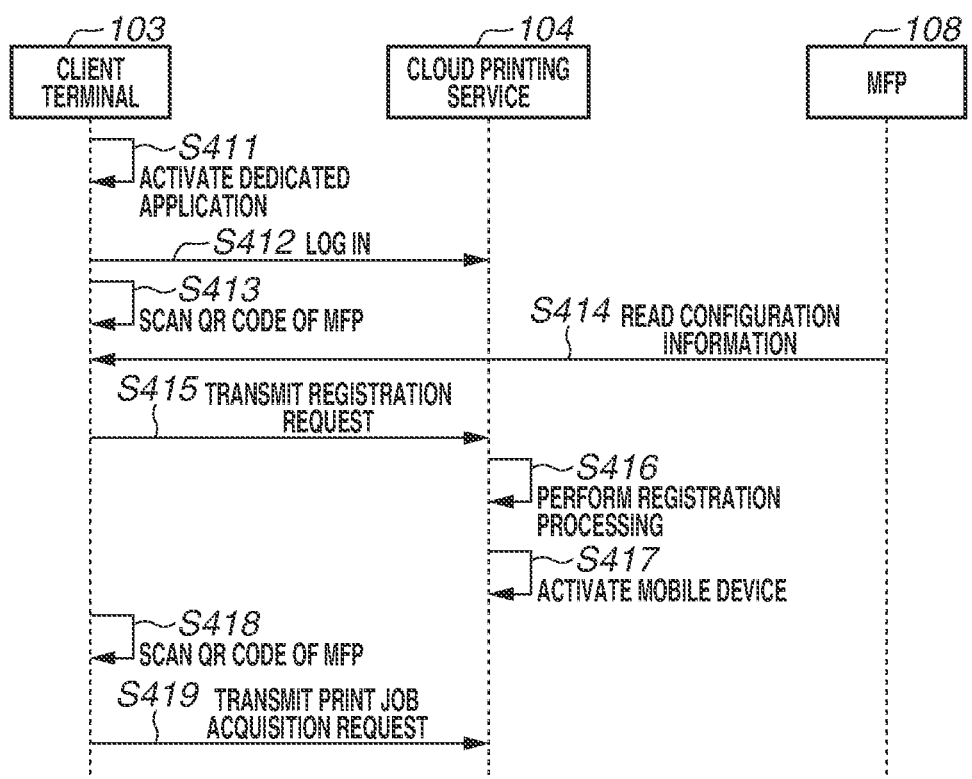

Next, a process of registering a printer in the CPS 104 will be described below with reference to FIGS. 4A and 4B. FIGS. 4A and 4B illustrate an example of a sequence of registering a printer in the CPS 104. FIG. 4A illustrates a case where the MFP 107 is registered to enable use of the MFP 107 from the CPS 104. FIG. 4B illustrates a case where the MFP 108 is registered in the CPS 104 using the client terminal 103 to enable use of the MFP 108 from the CPS 104.

In step S401, the MFP 107 transmits a registration request to the CPS 104. In step S402, the CPS 104 having received the registration request registers the MFP 107 as a printer that can be used from the first cloud printing service. After the registration of the MFP 107 is completed, the client terminal 101 in which the print client corresponding to the CPS 104 is installed can print via the CPS 104.

Next, print control in step S403 and subsequent steps after the printer registration is completed will be described below. In step S403, the client terminal 101 generates a print job based on receipt of a user operation for printing using a cloud printer registered in the CPS 104 and transmits the generated print job to the CPS 104. The print job transmitted to the CPS 104 includes print data, print settings (print attributes), and identification information for user identification. The print job can further include identification information for tenant identification.

In step S404, the CPS 104 having received the print job stores the received print job in the print job DB 309. In step S405, the MFP 107 transmits a print job acquisition request to the CPS 104. In step S406, the CPS 104 having received the request transmits the print job to the MFP 107. In step S407, the MFP 107 having received the print job performs printing processing and outputs a printed material. In step S408, after the execution of the print job is completed, the MFP 107 transmits a notification indicating that the print job acquisition is completed to the CPS 104. In step S409, the CPS 104 having received the notification deletes the print job.

In step S410, the CPS 104 accesses the print history DB 310 and updates the use record of the user. Specifically, the CPS 104 updates the use record of the user in association with the user by whom the print job has been transmitted. Further, the use records of the entire tenant are also updated at this timing. Further, print history information is also updated. As a result of the foregoing process, the MFP 107 becomes available for use by the CPS 104.

Next, a case where a dedicated application prepared for the CPS 104 registers the MFP 108 in the CPS 104 using the client terminal 103 (mobile) will be described below.

A case will be described where the dedicated application for the CPS 104 is installed in the client terminal 103 (mobile).

First, in step S411, the dedicated application for the CPS 104 is activated on the client terminal 103 (mobile). In step S412, login processing is performed to log in to the CPS 104 using an account of a user having a right to manage settings of a tenant "company A".

In step S413, in a case where the dedicated application for the CPS 104 is activated for the first time, a QR code® prepared for the MFP 108 is scanned to start a printer setup process. The QR code can be printed on a sheet stuck on an outer side of a main body of the MFP 108 using a sticker. Further, the QR code can be displayed on a screen provided by the MFP 108.

In step S414, configuration information (e.g., media access control (MAC) address, device serial No., Polling-FALSE) that specifies the MFP 108 is read from the QR code, and in step S415, a registration request including the read configuration information is transmitted to the CPS 104. The attribute "Polling-FALSE" indicates that a polling mechanism with respect to the CPS 104 is not supported, and is transmitted only in QR code scans.

In step S416, the CPS 104 having received the registration request registers the MFP 108 as a printer available for use via the first cloud printing service. In step S417, a mobile device is activated on the cloud printing service to enable receipt of print execution instructions from the mobile device. After the registration of the MFP 108 is completed, the CPS 104 manages the account name or the username recognized in step S412 and the configuration information included in the registration request in step S415 as a set.

The user stores the configuration information specifying the device and the login information in the dedicated application for the CPS 104. In order to enhance security, the login information can be input each time, or multi-factor authentication can be used.

Further, while the QR code is described as an example according to the present exemplary embodiment, aspects of the present disclosure are not limited to QR codes, and any methods by which the dedicated application for the CPS 104 can similarly acquire the configuration information from the MFP 108 using wireless communications such as Near Field Communication (NFC) or Bluetooth® Low Energy can be used. The registration request can be transmitted to the CPS 104 using the configuration information acquired from the MFP 108 or a dedicated memory for the MFP 108 using NFC or Bluetooth® Low Energy.

By performing operations described below after the registration of the MFP 107 is completed, printing processing is started by scanning the QR code on the printing apparatus using a dedicated application for the client terminal 103 as illustrated in steps S418 and S419.

Cooperation Between CPS 104 and External CPS

Figure 5:
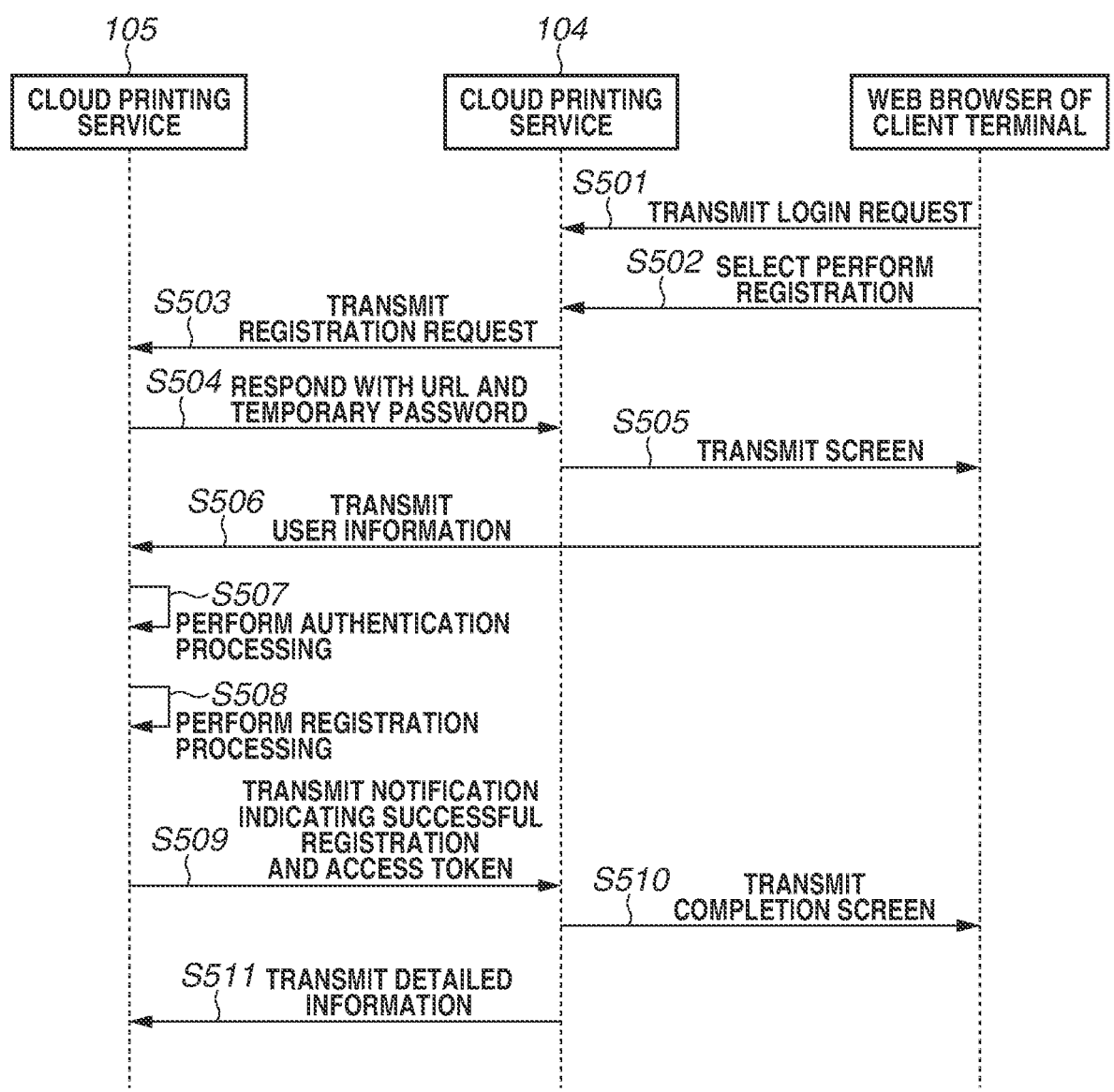
FIG. 5 is a sequence diagram illustrating an example of a process of registering a printer in an external CPS and cooperating.
Figure 6A:
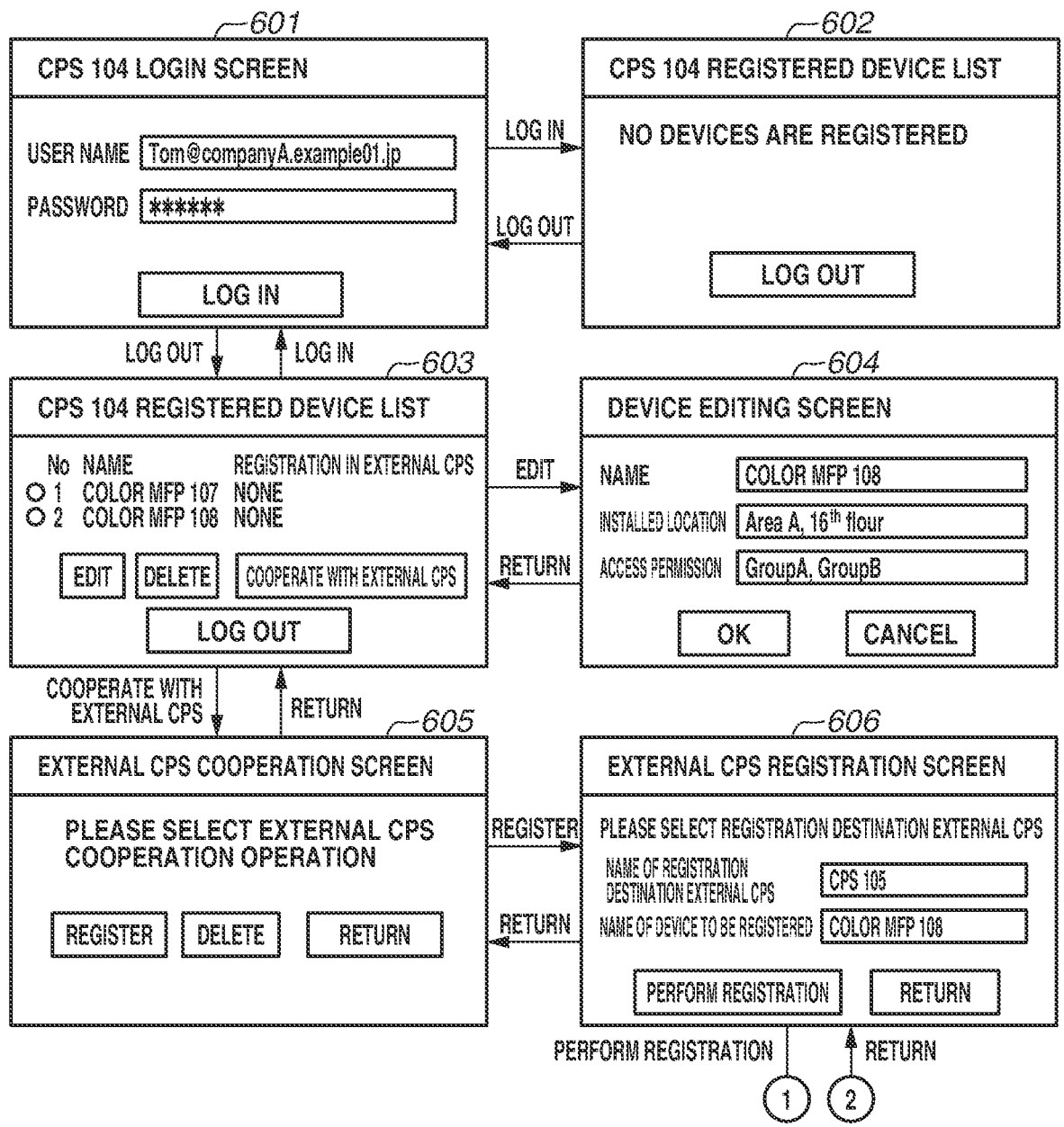
FIGS. 6A and 6B illustrate an example of screens displayed on an operation unit of a client terminal.
Figure 6B:
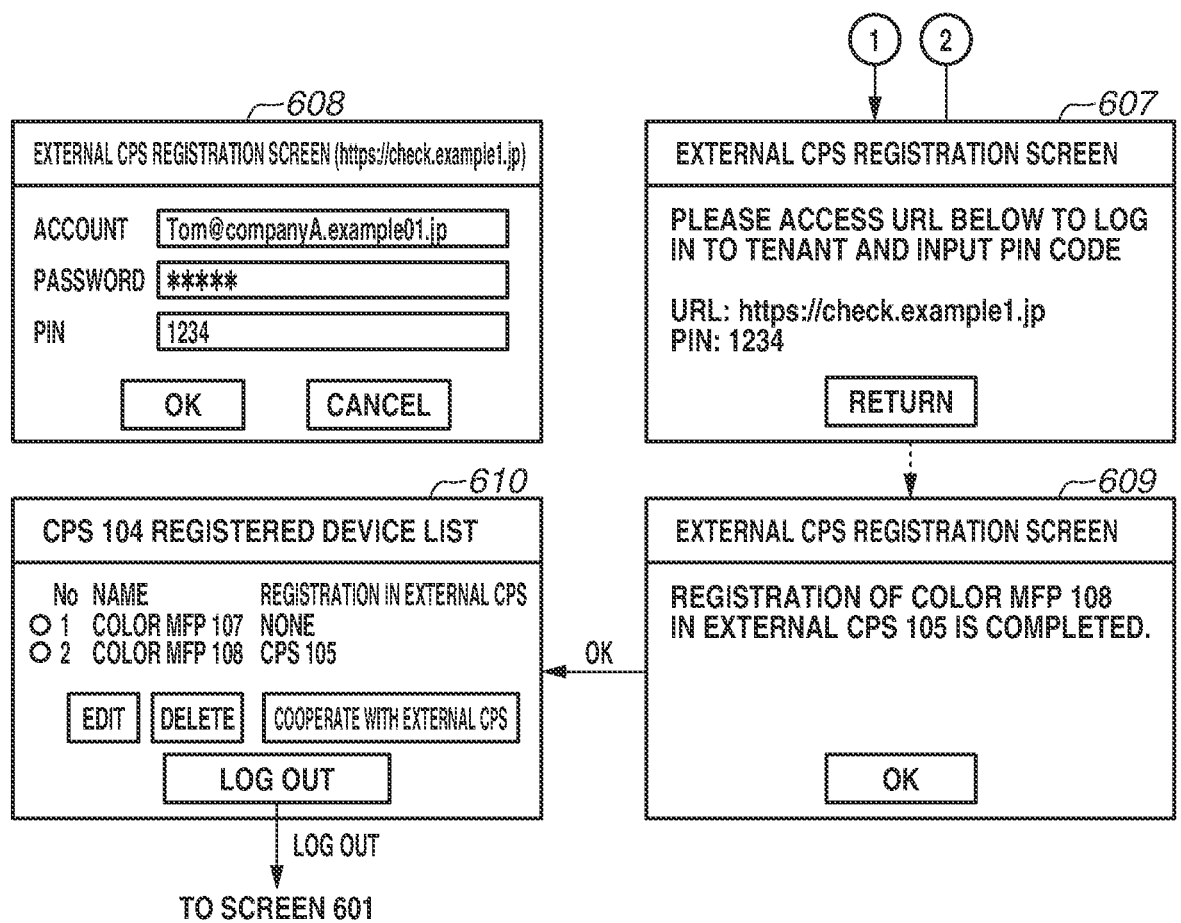
Figure 7A:
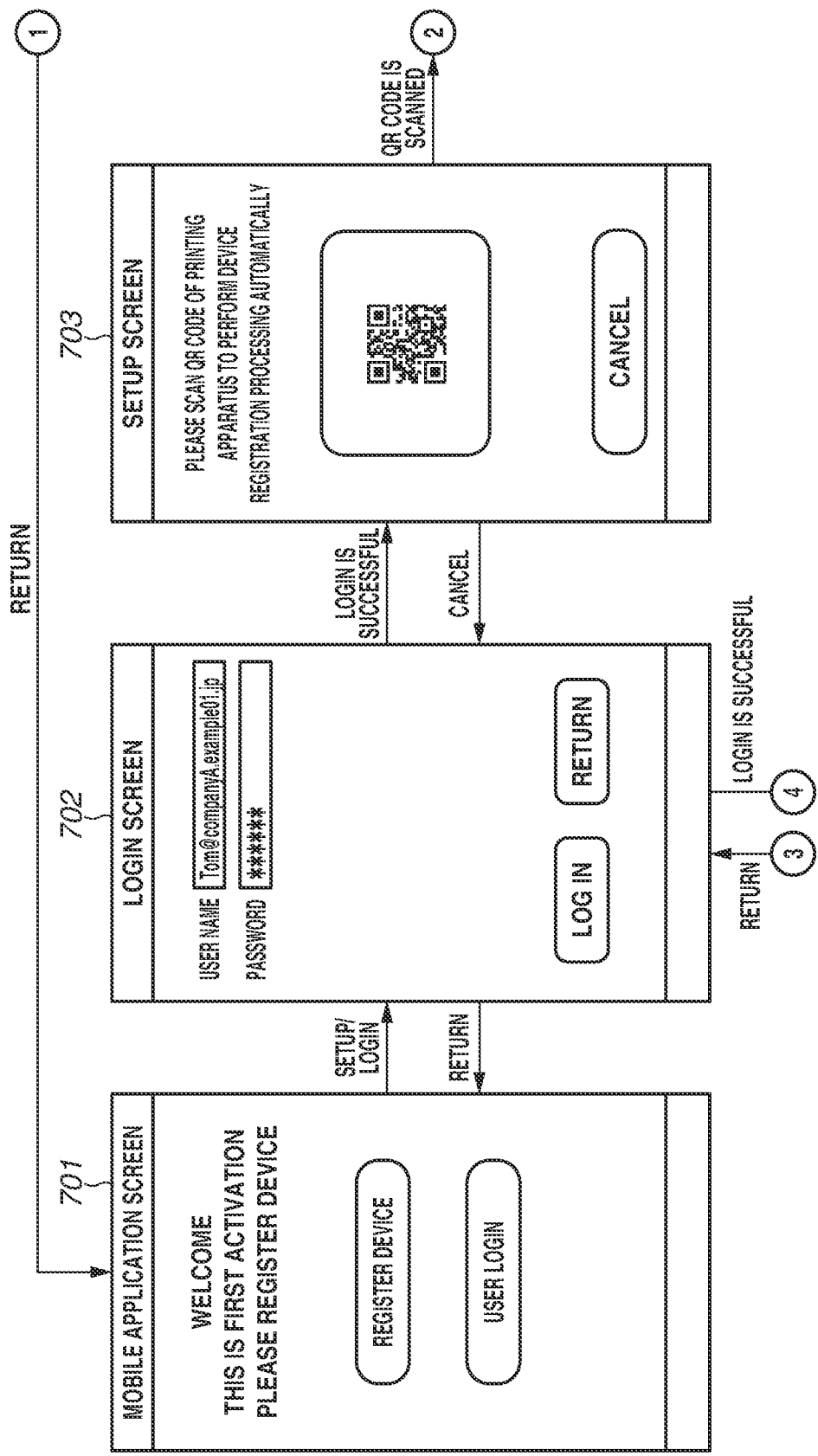
FIGS. 7A, 7B, and 7C illustrate an example of screens displayed on an operation unit of a client terminal.
Figure 7B:
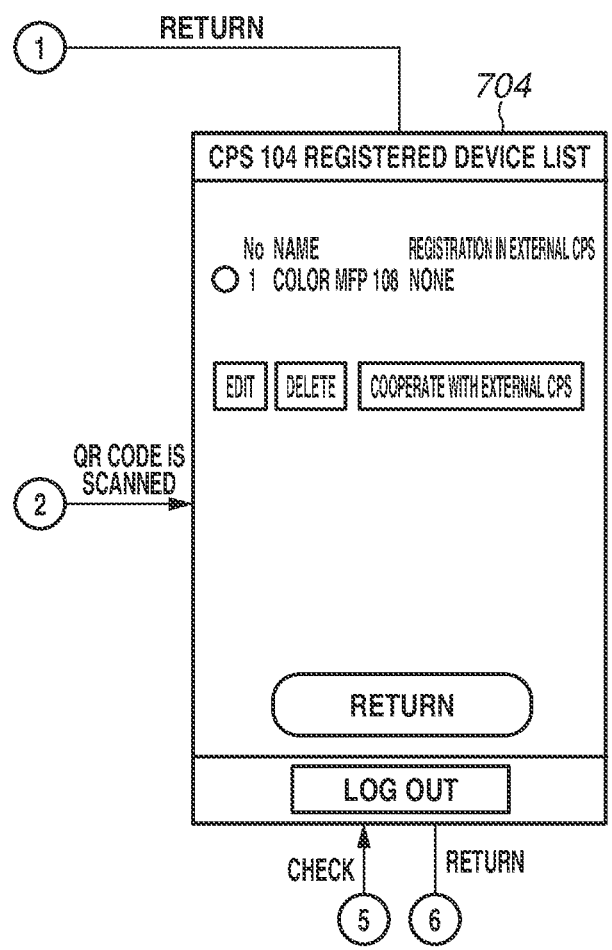
Figure 7C:
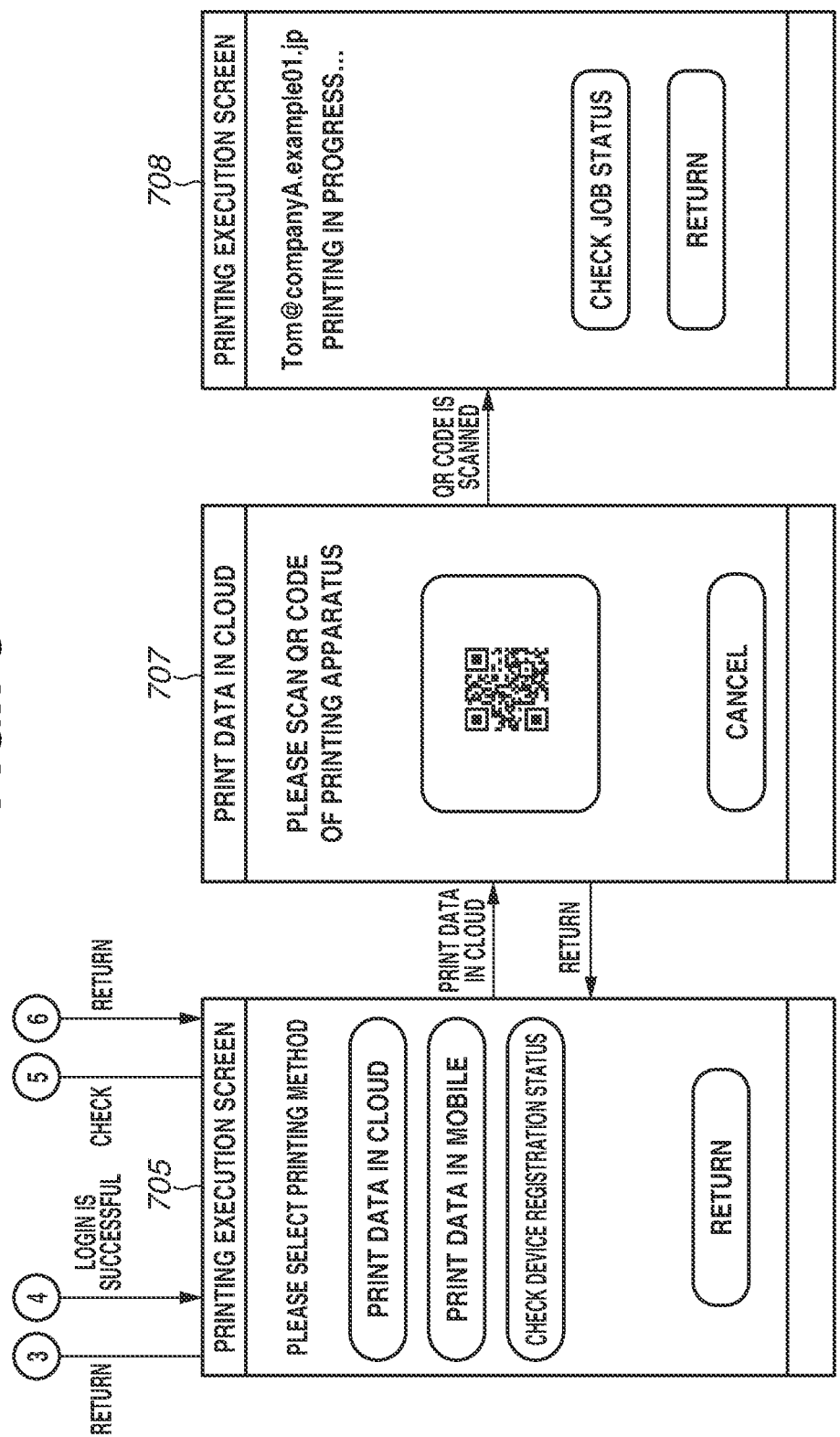
Figure 8:
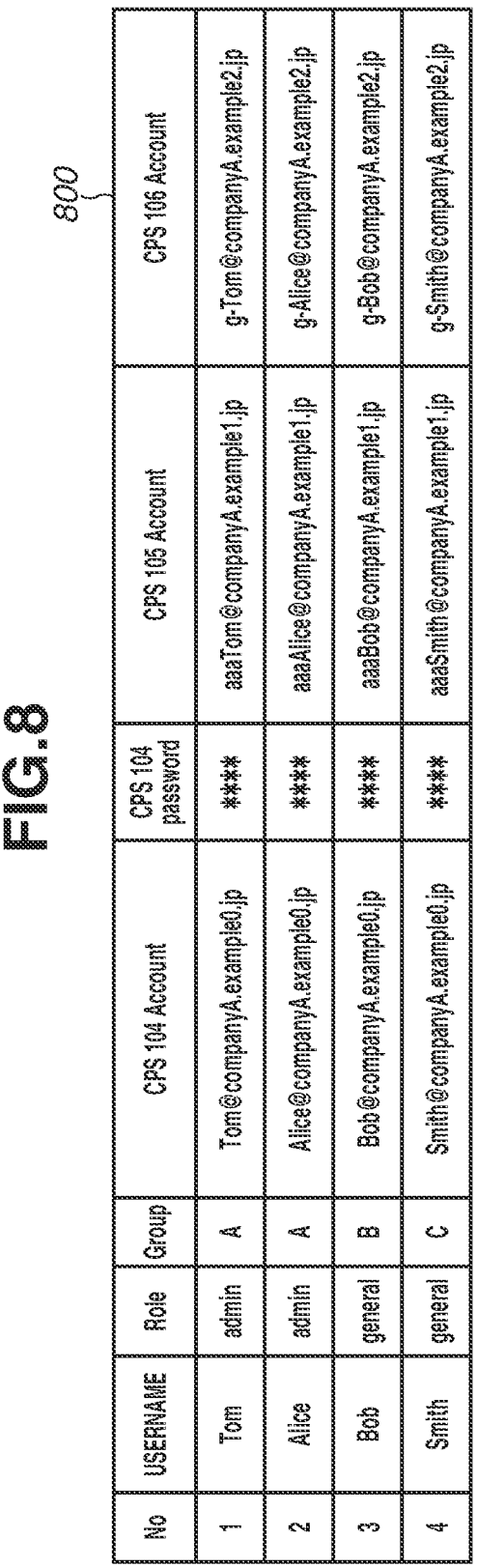
FIG. 8 illustrates an example of user information stored on a server providing a CPS.

A process of controlling the CPS 104 and an external CPS to cooperate with each other will be described below with reference to FIGS. 5 to 8. FIG. 5 is a sequence diagram illustrating an example of a process of registering a printer in the external CPS. FIGS. 6A, 6B and FIGS. 7A, 7B, and 7C illustrate examples of operation screens of a client terminal that relate to the control. FIG. 8 illustrates an example of user information stored in the authentication DB 308.

A process of registering a printer in the CPS 105 as an external CPS by the CPS 104 will be described below with reference to the sequence illustrated in FIG. 5.

In step S501, a web browser running on the client terminal accesses a web page provided by the CPS 104 based on a user operation and transmits a login request to the CPS 104 using an account of a user having a right to manage the settings of the tenant "company A" in the CPS 104.

Screen changes that relate to operations for the registration in the CPS 104 will be described below with reference to FIGS. 6A and 6B.

The user accesses a web page for logging in to the CPS 104 using the web browser. As a result, a login screen 601 is displayed on the web browser. More specifically, the transmission/reception unit 301 of the CPS 104 having received an access request transfers received data to the control unit 302. The control unit 302 interprets the access request, generates response data using the page generation unit 303, and transmits the login screen 601 to the client terminal via the transmission/reception unit 301.

The user inputs, via the login screen 601, an administrator username and a password that are registered in advance in the CPS 104, and attempts to web log in to the CPS 104. In a case where the web login succeeds, a main menu screen (not illustrated) is displayed. A user corresponding to an account "Tom@companyA.example0.jp" has an administrator right of the tenant as illustrated in a user authentication DB in FIG. 8. Thus, in a case where the input password is correct, the login succeeds. The user selects a link on the main menu screen to change to a lower-layer screen and sets various settings. Screens that relate to the cloud printing service registration will be described below.

The CPS 104 having received a Hypertext Transfer Protocol (HTTP) request to change to a printer registration screen generated based on a user operation via the web browser generates a list screen 603 and transmits the generated list screen 603 to the client terminal. The administrator can change the settings for the CPS 104 and can perform registration in an external CPS via the screen 603 displayed on the client terminal. The screen 603 illustrates a case where the registration of the MFPs 107 and 108 as printers available for use by the CPS 104 is completed by the registration control illustrated in FIGS. 4A and 4B. In a case where no printing apparatus is registered, a screen 602 is displayed.

In the screen 603, a "NAME" section displays device names of MFPs registered in the CPS 104. The device names are names for identifying the printers. A "REGISTRATION IN EXTERNAL CPS" section is an area indicating that each MFP is registered or not registered in an external CPS. A case where none of the MFPs are registered in an external CPS is illustrated herein as an example. An "EDIT" key is a key that is used to edit a setting of a registered cloud printer, and a "DELETE" key is a key that is used to delete a registered cloud printer. A "COOPERATE WITH EXTERNAL CPS" key is a key that is used to set a setting to cause a registered cloud printer to cooperate with an external cloud printing service. A "LOG OUT" key is a key that is used to log out of the CPS 104.

In a case where the "EDIT" key is selected, the display screen changes to a screen 604. The user can edit registered device information via the screen 604. For example, a device name, an installed location, and a list of users with an access permission can be edited. An item "ACCESS PERMISSION LIST" is a display item for setting user accounts or groups permitted to access the device and roles. For example, users of Groups A and B are set as users permitted to access the device. As illustrated in FIG. 8, the user authentication DB 308 for the tenant "company A" stores usernames, groups to which the users belong, roles, and account names for external CPSs. The screen 604 illustrates a case where Groups A and B are permitted to access as an example. In this case, Tom, Alice, and Bob are permitted to use the device whereas Smith is not permitted to use the device. Details of settings that are set via the screen 604 are stored in the setting DB 307. In FIG. 8, not only user information for the CPS 104 but also correspondence information indicating a correspondence relationship between user accounts for the CPS 104 and user accounts for the external CPSs are stored. The correspondence information is preset by a user such as an administrator.

Back to the screen 603, in a case where the "COOPERATE WITH EXTERNAL CPS" key is selected in a state where a specific device is selected, the CPS 104 changes the display screen on the web browser to a screen 605.

In a case where a "REGISTER" key is selected on the screen 605, the CPS 104 changes the display on the web browser to a screen 606. The screen 606 is an example of a screen for selecting in which external CPS the CPS 104 is to be registered. FIGS. 6A and 6B illustrate an example where the CPS 105 is selected as a registration destination external CPS and "COLOR MFP 108" is set as a name of a device to be registered. The registration destination external CPS and the device name can be changed based on user operations via the screen 606. In a case where a "PERFORM REGISTRATION" key is selected, the CPS 104 performs registration processing.

Referring back to the sequence in FIG. 5, in step S502, the client terminal transmits data indicating that the "PERFORM REGISTRATION" is selected to the CPS 104 based on receipt of a user operation of selecting the "PERFORM REGISTRATION" key on the screen 606.

In step S503, in a case where the CPS 104 receives the data indicating that the "PERFORM REGISTRATION" key is selected, the CPS 104 transmits a registration request to the CPS 105. Specifically, the setting management unit 304 of the CPS 104 refers to a list of destination uniform resource locators (URLs) of external CPSs stored in the setting DB 307 and transmits the device registration request to the corresponding destination URL.

In step S504, the CPS 105 having received the device registration request responds to the CPS 104 with a URL for inputting authentication information and a temporary password (personal identification number (PIN) code according to the present exemplary embodiment) for authentication. The URL is, for example, "https://check.example1.jp".

In step S505, the CPS 104 having received the response from the CPS 105 generates a screen 607 based on the information and transmits the generated screen 607 to the web browser of the client terminal.

A user such as an administrator checks the screen 607 and accesses the URL displayed using the web browser. The CPS 105 provides a screen 608 as a response to the request to access the URL from the web browser. The user inputs account information for the CPS 105 and the PIN code issued in step S504 via the screen 608. In step S506, based on selection of an "OK" key, the web browser transmits, to the CPS 105, data indicating the user information and the PIN code that are input via the screen 608. In step S507, the CPS 105 receives the data indicating the user information and the PIN code and performs authentication processing based on the received data. In a case where the authentication is determined as being successful, in step S508, the CPS 105 performs the registration processing to register the printer (the MFP 108) based on the request received in step S503. Then, in step S509, the CPS 105 transmits, to the CPS 104, a notification of the successful registration of the information about the MFP 108 and access token information for use in subsequent communication.

In step S510, in a case where the CPS 104 receives the notification of the successful registration from the CPS 105, the CPS 104 transmits completion screen data to the client terminal. The web browser of the client terminal having received the completion screen data displays a completion screen based on the received screen data. A screen 609 is an example of the completion screen.

In a case where an "OK" key is selected, the CPS 104 changes the display screen on the web browser to a list screen 610 with updated information about the registration in the external CPSs. The screen 610 displays information indicating that the MFP 108 is registered in the CPS 105. In a case where a "LOG OUT" key is selected, the display screen is changed to the screen 601.

Then, in step S511, the CPS 104 additionally transmits more detailed device information about the MFP 108 to the external CPS 105. The CPS 105 uses the Internet Printing Protocol (IPP) as a protocol. The setting management unit 304 of the CPS 104 generates capability information in IPP format based on capability information about the cloud printer corresponding to the MFP 108. The control unit 302 transmits the generated capability information. The CPS 105 having received the capability information updates the capability information about the cloud printer with the CPS 104 set as an output destination based on the received capability information.

Thereafter, information about the MFP 107 can also be registered in the CPS 105, similarly to the MFP 108, by designating the MFP 107 on the screen 610 and selecting the "COOPERATE WITH EXTERNAL CPS" key. This processing is substantially similar to those described above, so that redundant descriptions thereof are omitted.

Next, an example of screen changes on an operation unit of the client terminal 103 (mobile) that relate to the registration processing illustrated in FIG. 4B will be described below with reference to FIGS. 7A, 7B, and 7C.

A user activates the dedicated application for the CPS 104 on the client terminal 103 (mobile), and a mobile application screen 701 is displayed. In step S501, in a case where a "REGISTER DEVICE" key is selected, a login screen 702 is displayed. The user inputs, via the login screen 702, an administrator username and a password that are registered in advance in the CPS 104, and attempts to web log in to the CPS 104. In a case where the web login succeeds, a setup screen 703 is displayed. The user corresponding to the account "Tom@companyA.example0.jp" has an administrator right of the tenant as illustrated in the user authentication DB in FIG. 8. Thus, in a case where the input password is correct, the login succeeds.

In a case where the dedicated application is activated for the first time on the client terminal 103, the dedicated application displays the setup screen 703 to prompt the user to scan the QR code. In a case where a scan of the QR code is detected, the dedicated application reads the configuration information (e.g., MAC address, device serial No., Polling-FALSE) that specifies the device. Then, the dedicated application transmits the registration request including the configuration information to the CPS 104 as in step S415 described above. The CPS 104 having received the HTTP request of the registration request generates screen information about a list screen 704 and transmits the generated screen information to the client terminal 103.

With the dedicated application of the client terminal 103, a user such as an administrator can edit and delete printer information registered in the CPS 104 and can perform the registration processing of registering in an external CPS via the displayed screen 704. The screen 704 illustrates an example of a case where the registration of the MFP 108 as a printer available for use by the CPS 104 is completed. The process after the "REGISTRATION IN EXTERNAL CPS" key is selected on the screen 704 is similar to those described above with reference to the sequence from step S502 and FIGS. 6A and 6B, so that redundant descriptions thereof are omitted.

On the other hand, in a case where the activation of the dedicated application on the client terminal 103 is not the first activation, the dedicated application provides a screen 705. In a case where a "PRINT DATA IN CLOUD" key is selected on the screen 705, the dedicated application provides a screen 707. The display of the screen 707 prompts the user to scan a QR code of a printing apparatus (the MFP 108 herein) with which the data (print job) received from the cloud is to be printed. In a case where the QR code is scanned and configuration information about the MFP 108 is read, the read information is transmitted to the CPS 104, and the printing processing is started. At this time, the dedicated application provides a screen 708. Details of the printing processing that is started at this time will be described below with reference to FIG. 10.

In a case where a "CHECK DEVICE REGISTRATION STATUS" key is selected on the screen 705, the dedicated application acquires screen information from the CPS 104 and provides the screen 704. The screen 705 can further include a "REGISTER ADDITIONAL DEVICE" button (not illustrated). In this case, the dedicated application displays the setup screen 703, and the above-described registration processing for another printing apparatus is implemented.

By the foregoing series of processing, a cloud printer registered in the CPS 104 is registered as an output destination device (printing apparatus) that can be used from a print client supporting the external CPS 105.

Printing Processing

The printing processing will be described in detail below with reference to FIGS. 9 to 12.

A sequence illustrated in FIG. 9 is an example of the printing processing in a case where printing is performed by the MFP 107. The MFP 107 includes a function (polling mechanism for the CPS 104) of transmitting a print job acquisition request to the CPS 104, acquiring a print job, and performing printing. A sequence illustrated in FIG. 10 is an example of the printing processing in a case where printing is performed by the MFP 108. FIG. 12 is a flowchart illustrating a process in a case where the CPS 104 receives an instruction to perform printing.

FIG. 9 illustrates an example of a sequence in a case where user Alice performs printing. For example, the client terminal 102 is a PC with an OS such as Windows installed therein, and the CPS 105 is a cloud printing service that is provided on a platform such as Azure. Further, for example, the communication protocol B used by the CPS 105 is IPP.

First, in step S901, Alice logs in to the CPS 105 from the client terminal 102 using an account "aaaAlice@companyA.example1.jp" associated with a cloud platform providing the CPS 105. Next, in step S902, the client terminal 102 searches for registered printers on the CPS 105.

The CPS 105 stores information about cloud printers (information about the MFPs 107 and 108) that cooperate with the CPS 104 registered in FIG. 5. Therefore, an MFP that is the "color MFP 107" is discovered by the search in step S902. Next, Alice selects desired content, sets the "color MFP 107" as a printer to use in printing, and issues an instruction to start printing.

In step S903, the client terminal 102 having received the instruction to start printing transmits a print job to the CPS 105.

In step S904, the CPS 105 receives the print job from the client terminal 102 and stores the received print job in the storage 204.

In step S905, the CPS 104 checks whether the storage 204 of the CPS 105 stores a print job for the cloud printer corresponding to the color MFP 107. According to the present exemplary embodiment, a request for the checking of a print job in step S905 is transmitted from the CPS 104 to the CPS 105 at regular intervals. The intervals of the request can be an interval designated by the CPS 105 or an interval set for the CPS 104. Further, the CPS 104 can transmit an event notification to the CPS 105 to notify the CPS 105 of the presence of the print job.

In step S906, the CPS 104 transmits a print job acquisition request to the CPS 105 based on a result of the checking in step S905. At this time, the CPS 104 transmits the request using the access token acquired in step S509. Then, in step S907, the CPS 105 transmits a print job to be processed by the MFP 107 to the CPS 104. As described above, a case where the communication protocol used by the CPS 105 is IPP is illustrated by the present exemplary embodiment. Thus, the print job transmitted from the CPS 105 is in a format based on IPP, such as a format 1101 illustrated in FIG. 11. Step S910 described below is also performed by an IPP operation.

In step S908, the CPS 104 determines whether the print job received from the CPS 105 is a job of a user having an access right to access a cloud printer resource. First, the control unit 302 determines of which user the print job is. The control unit 302 acquires a field name of "Requesting-user-name" included in the print job based on IPP. According to the present exemplary embodiment, a case where an account name of Alice for the CPS 105 is stored as an attribute value of "Requesting-user-name" is intended. Then, the control unit 302, in cooperation with the authentication unit 305, refers to authentication information 800 stored in the authentication DB 308 using the acquired account name for the external CPS 105 and specifies an account of Alice for the CPS 104. Then, the control unit 302 acquires group information to which the specified "Alice" belongs. Next, in step S909, the control unit 302, in cooperation with the setting management unit 304, refers to the access permission list stored in the setting DB 307 and determines whether Alice is a user belonging to a group permitted to print using the MFP 107. In a case where Alice is not a permitted user, the acquired print job is discarded, and a response indicating an access error is transmitted to the CPS 105. On the other hand, in a case where Alice is a permitted user, the print job acquired in step S907 is stored in the print job DB 309.

In step S910, in a case where the storing of the print job is completed, the CPS 104 transmits a notification indicating that the print job acquisition is completed to the CPS 105. In step S911, the CPS 105 having received the notification deletes the transmitted print job from a queue corresponding to the output destination device.

Next, in step S912, the CPS 104 converts data attributes of the print job from a communication protocol format (e.g., IPP) of the CPS 105 to a communication protocol format (e.g., HTTP) used by the CPS 104. The CPS 104 uses, for example, a unique protocol based on HTTP. The printing management unit 306 of the CPS 104 converts the print attributes of the received print job based on IPP to print job attributes 1102 illustrated as an example in FIG. 11. At this time, the printing management unit 306 replaces the attribute value of "Requesting-user-name" to another attribute value such as "Alice" or "Alice@companyA.example1.jp" that can be interpreted by the CPS 104.

Next, a process of controlling the MFP 107 to acquire a print job stored in the CPS 104 and to print will be described below.

The MFP 107 periodically checks whether there exists a print job for the MFP 107 in the CPS 104 at regular intervals. This polling interval can be an interval designated by the CPS 104 or an interval set for the MFP 107. The request to check print jobs is implemented by transmitting a job check request storing "False" in an attribute "Which-jobs" indicating an operation of checking all print jobs for the MFP 107. Further, in a case where the login to the MFP 107 is managed, a request to check print jobs can be transmitted at a timing at which a specific user logs in. In this case, a request to check only print jobs for the logged-in user is transmitted. In this case, for example, the attribute "Which-jobs" is set to "True". Further, an attribute value indicating the username of Alice or account information about Alice is stored in an attribute that specifies the user, such as "Requesting-user-name" or "Requesting-user-uri". This operation enables acquisition of only jobs of the user having logged in to the MFP 107 from the CPS 104.

In step S913, the MFP 107 transmits a print job acquisition request based on the communication protocol (e.g., HTTP) used by the CPS 104. In step S914, the CPS 104 receives the print job acquisition request based on the communication protocol (e.g., HTTP) used by the CPS 104 and specifies the MFP 107 as a requester. Then, in step S915, the CPS 104 transmits a print job to be processed by the MFP 107 as an HTTP response to the request in step S913. The process thereafter is similar to steps S407 to S410 in FIG. 4 described above, so that redundant descriptions thereof are omitted.

By the foregoing series of processing, the print job input to the CPS 105 is acquired by the CPS 104 and printed via the CPS 104. Further, not only a print history of print jobs input to the CPS 104 but also a print history of print jobs input to the CPS 105 are managed centrally by the CPS 104.

Next, a sequence in a case where the user Alice performs printing processing using the MFP 108 will be described below with reference to FIG. 10. As described above with reference to FIGS. 4A and 4B, the client terminal 103 is a mobile terminal, and the dedicated application for the CPS 104 is installed in the client terminal 103.

In step S1001, the user Alice activates the dedicated application for the CPS 104 on the client terminal 103 (mobile) and displays the screen 701. In step S1002, in a case where a "USER LOGIN" is selected, the login screen 702 is displayed. The administrator username and the password that are registered in advance in the CPS 104 are input via the login screen 702 to attempt to web log in to the CPS 104. In a case where the web login succeeds, the print execution screen 705 is displayed. Alternatively, the login processing to the CPS 104 can be performed automatically using the login information stored in the dedicated application of the CPS 104 and the configuration information specifying the device and stored in the dedicated application of the CPS 104.

In a case where the "CHECK DEVICE REGISTRATION STATUS" key is selected on the print execution screen 705, the display screen changes to the screen 704, and a current device registration status and a current external CPS registration status can be checked. In a case where a "PRINT DATA IN MOBILE" key is selected, data held in the client terminal 103 (mobile) is transmitted to the CPS 104. With the transmitted data, the CPS 104 holds a new print job.

Further, in a case where the "PRINT DATA IN CLOUD" key is selected on the print execution screen 705 by the user Alice, the dedicated application displays the screen 707. Step S1003 and subsequent steps are performed based on user operations using the screen 707.

In step S1003, the client terminal 103 scans the QR code on the sheet stuck on the surface of the main body of the MFP 108 on the screen 707. In a case where the scan succeeds, the dedicated application displays the screen 708. In step S1004, the dedicated application transmits, to the CPS 104, a print request including the configuration information of the printing apparatus (the MFP 108) that is read from the QR code.

In step S1005, the CPS 104 having received the print request determines that the received request is a print request from the dedicated application, and then checks that the received request is a print request by scanning the QR code via the dedicated application based on the configuration information included in the print request.

At this time, an attribute value of "Polling-FALSE" included in the configuration information is checked. Whether the attribute "Polling-FALSE" is registered in the printing apparatus can be checked by referring to information at the time of the device registration from the identification information (device serial No.) about the printing apparatus that is included in the configuration information.

In step S1006, the control unit 302, in cooperation with the authentication unit 305, refers to the authentication information 800 stored in the authentication DB 308 and specifies, from the account information of the user Alice for the CPS 104, an account name of the user Alice for the external CPS and address information for use in IPP requests to the external CPS. At this time, "Print-service-URL" for requesting the CPS 105 to print is specified.

In step S1007, the control unit 302 specifies a job storing the account name of the user Alice for the CPS 104 in an attribute value of "HTTP-Requesting-user-name" from among the print jobs managed in the storage 204 by the CPS 104. Then, the CPS 104 transmits the specified print job to the CPS 105 using an IPP Fetch-Document attribute in "Print-service-URL".

At this time, the MFP 108 implements push notification from the CPS 105 using an IPP Get-Notifications request to the CPS 105. This enables the CPS 105 to notify the MFP 108 of a print event relating to the print job transmitted from the CPS 104 based on the print job transmission event in step S1007. In step S1008, the push notification system is used, and the CPS 105 transmits the print job received in step S1007 to the MFP 108.

In step S1009, the MFP 108 having received the print job performs printing processing based on the print job and outputs a printed material. In step S1010, after the execution of the print job is completed, the MFP 108 transmits a notification indicating that the printing is completed to the CPS 105. In step S1011, the CPS 105 having received the notification notifies the CPS 104 that the printing of the print job received in step S1007 is completed.

In step S1012, the CPS 104 having received the printing completion notification deletes the corresponding job information from the print jobs managed using the storage 204 of the CPS 104. In step S1013, the CPS 104 accesses the print history DB 310 and updates the use record of the user.

Specifically, the use record of the user Alice is updated in association with the user having transmitted the print job. The processing by the CPS 104 in steps S1012 and S1013 are similar to the processing in steps S409 and S410 described above.

According to FIG. 10, the acquisition of the configuration information by the user scanning the QR code on the sheet stuck on the main body of the MFP 108 using the client terminal 103 triggers printing of the print job input to the CPS 104 via the CPS 105 using the MFP 10.

Specifically, in a case where a printing apparatus such as the MFP 108 that does not support the function of cooperating with the CPS 104 for the print job acquisition, a cloud service supported by the printing apparatus cooperates with the CPS 104. Thus, according to an aspect of the present disclosure, the user can transfer a print job input to the CPS 104 to another cloud service and can print using the printing apparatus such as the MFP 108 simply by acquiring the configuration information on a terminal of the user in printing.

The attribute fields and the attribute values that are described above with reference to the drawings up to FIG. 10 are mere examples and are not intended to limit the attribute fields and the attribute values.

FIG. 12A is a flowchart illustrating a process relating to printing by the CPS 104.

In step S1201, the control unit 302 of the CPS 104 determines whether a print job acquisition request is received. In a case where a print job acquisition request is received (YES in step S1201), the processing proceeds to step S1202. The request received in step S1201 corresponds to the request received in step S913 in FIG. 9 or in step S1004 in FIG. 10.

In step S1202, the control unit 302 of the CPS 104 checks details of configuration information included in the print job acquisition request. Whether the printing apparatus that is a printing target is a device registered with the attribute "Polling-FALSE" is determined by referring to the details of the configuration information. In a case where the determination result indicates "Polling-FALSE" (YES in step S1202), the processing proceeds to step S1205. Otherwise (NO in step S1202), the processing proceeds to step S1203. The case where the determination result indicates "Polling-FALSE" (YES in step S1202) corresponds to the processing that proceeds from step S1005 to step S1006 in FIG. 10. On the other hand, the case where the determination result does not indicate "Polling-FALSE" (NO in step S1202) corresponds to the processing that proceeds from step S914 to step S915 in FIG. 9.

In step S1203, the control unit 302 specifies a print job corresponding to the account information of the user having issued the print job acquisition request from among the print jobs managed in the storage 204 of the CPS 104 via the printing management unit 306. In step S1204, the control unit 302 transmits the specified print job to the printing apparatus that is the transmitter of the print job acquisition request. This corresponds to the processing of step S915 in FIG. 9.

In step S1205, the control unit 302 specifies a print job corresponding to the account information of the user having issued the print job acquisition request from among the print jobs managed in the storage 204 of the CPS 104 via the printing management unit 306. Further, the control unit 302, in cooperation with the authentication unit 305, specifies account information for the external CPS (the CPS 105) corresponding to the account information of the user having issued the print job acquisition request.

In step S1206, the control unit 302 transfers the specified print job together with the specified account information to the external CPS (the CPS 105). The transfer destination is "Print-service-URL" as in step S1007 in FIG. 10 described above.

A trigger for printing using the MFP 108 can be the acquisition of the configuration information by the dedicated application using a wireless communication function of the client terminal 103, such as NFC, by a user operation, in place of the scan of the QR code. Further, the configuration information can be acquired also by a scan of code information instead of a QR code.

According to the first exemplary embodiment, whether the printing apparatus includes the polling mechanism for the CPS 104 is specified based on the configuration information included in the print job acquisition request triggered by the scan of the QR code through the dedicated application, and the CPS 104 controls a printing path thereafter.

According to a second exemplary embodiment, on the contrary, control using the registration information at the time of the registration of the printing apparatus in the CPS 104 will be described below. In the present exemplary embodiment, a case where, for example, the user determines to install the CPS 104 after having installed the external CPS 105 and wishes to conduct centralized management is illustrated. The usability can be maintained even after the CPS 104 is installed.

Figure 13:
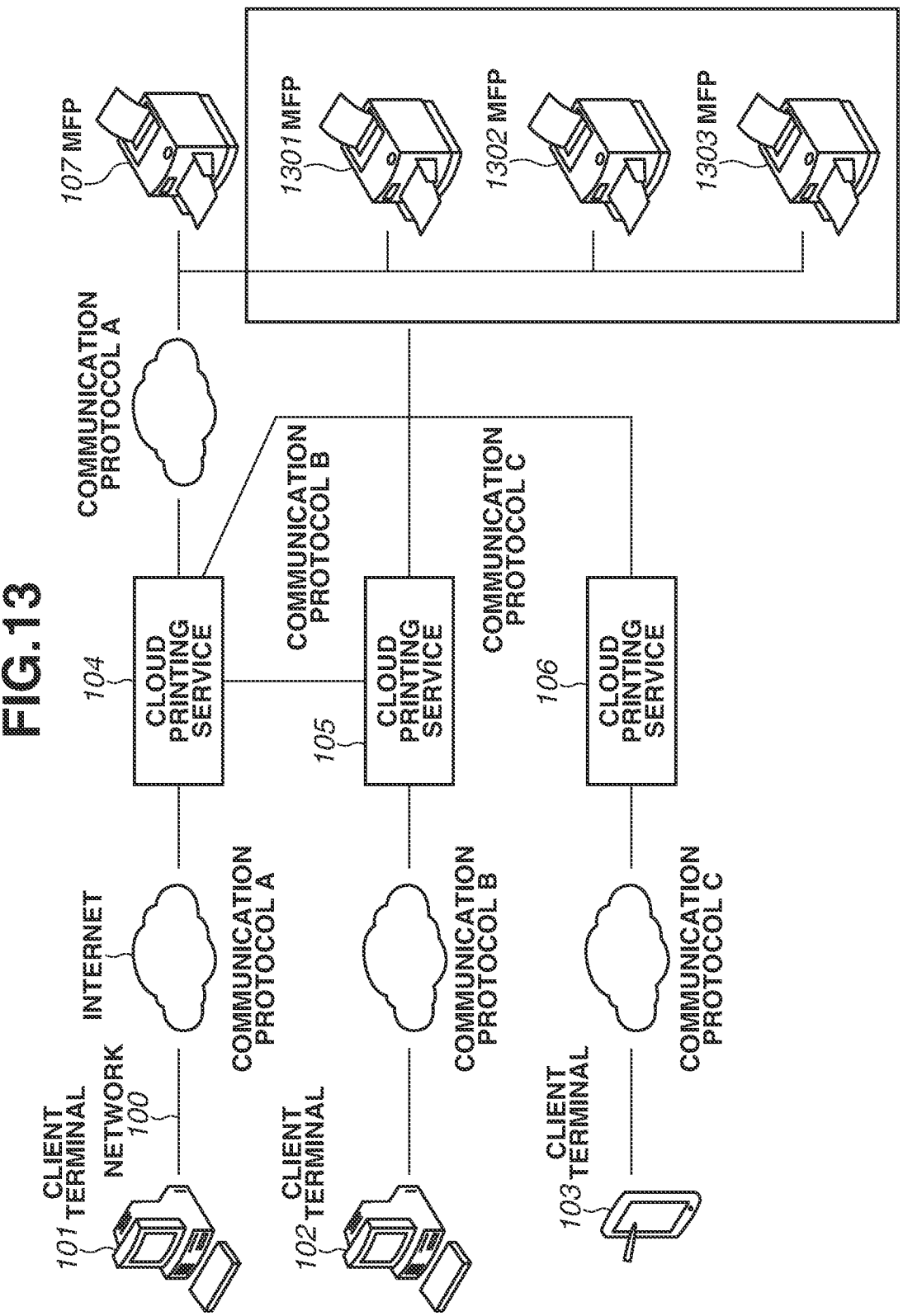
FIG. 13 is a diagram illustrating an example of a printing system according to a second exemplary embodiment.

FIG. 13 illustrates an example of a printing system according to the second exemplary embodiment. The printing system further includes color MFPs 1301 and 1302 and an MFP 1303 dedicated to monochrome printing in addition to the configuration according to the first exemplary embodiment.

A case where a cloud printer corresponding to the MFPs 107 and 1301 to 1303 is registered in the CPS 104 according to according to the present exemplary embodiment will be described below as an example. Specifically, the MFPs 107 and 1301 to 1303 are registered as a cloud printer for "companyA.example0.jp" in the CPS 104. Software and hardware configurations of the CPSs 104 to 106 and the printing apparatuses in the system according to the second exemplary embodiment are similar to those according to the first exemplary embodiment. Differences between the present exemplary embodiment and the first exemplary embodiment will be described below.

Figure 14:
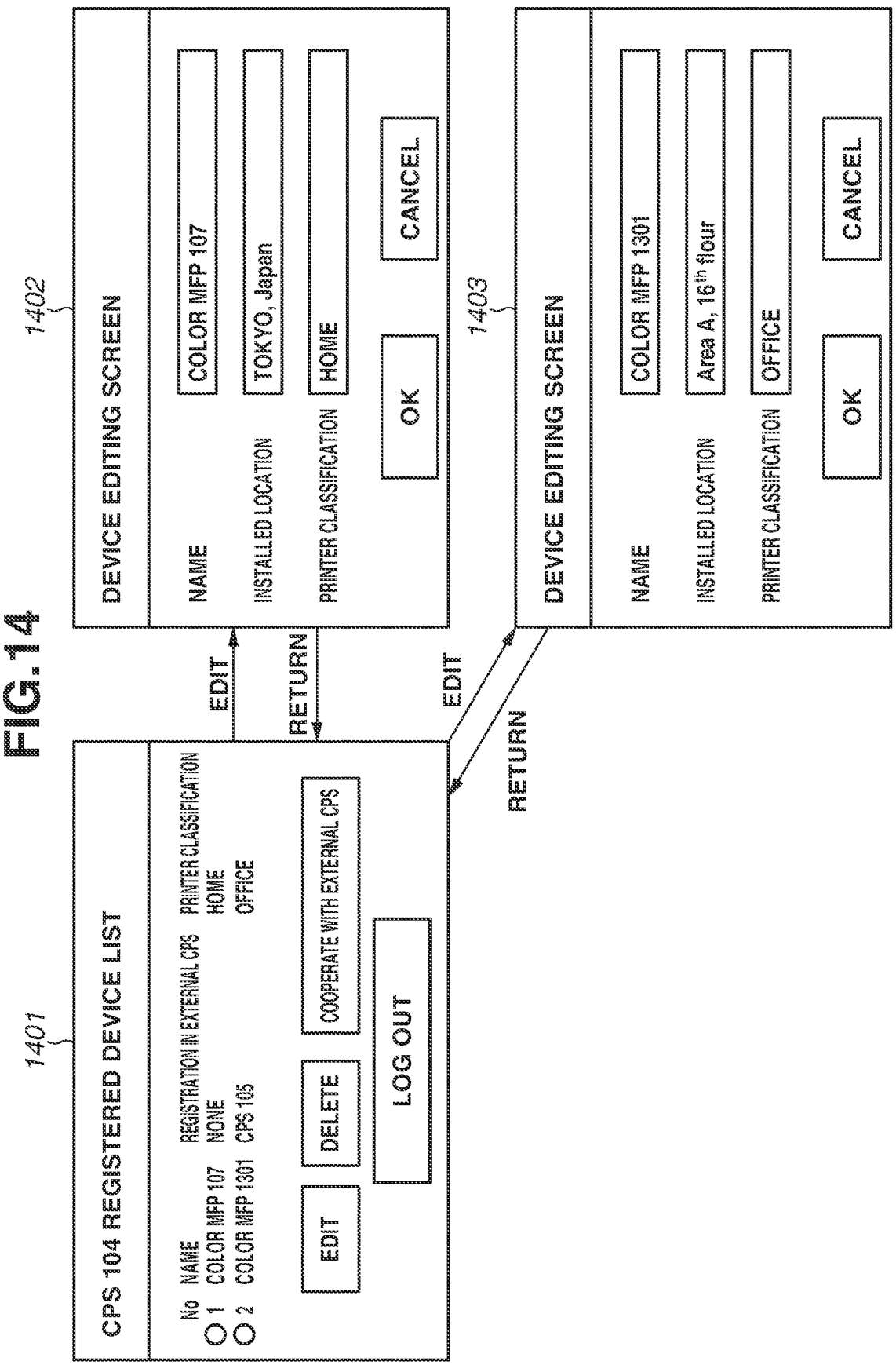
FIG. 14 illustrates an example of screens displayed on an operation unit of a client terminal according to the second exemplary embodiment.

FIG. 14 illustrates screens that relate to the device registration in a cloud printing service according to the second exemplary embodiment. FIG. 14 illustrates an examples of screens provided to a client terminal by the CPS 104. A screen 1401 is a screen that is displayed in place of the screen 603 in FIG. 6A. A screen 1402 further includes a "PRINTER CLASSIFICATION" key in addition to the keys on the screen 603 described above. In a case where a printing apparatus is selected and an "EDIT" key is operated on the screen 1401, the display screen changes to the screen 1402 or 1403.

A user such as an administrator can register a printing apparatus as a device (printing apparatus) for office and another printing apparatus as a device for home via the screen 1402 and screen 1403, and attributes of the classification are managed as supplemental device information. A case where the color MFP 107 is registered as a device for home on the screen 1402 and the MFP 1301 is registered as a device for office on the screen 1403 is illustrated as an example.

Next, a process relating to control of printing by the CPS 104 according to the present exemplary embodiment will be described below with reference to a flowchart in FIG. 12B. The flowchart in FIG. 12B further includes step S1210 in addition to the process illustrated in FIG. 12A.

In step S1210, in a case where the determination result does not indicate "Polling-FALSE" (NO in step S1202), the control unit 302 refers to the classification attribute that is registered in the CPS 104 and is for the printing apparatus being a printing target specified based on the configuration information. In a case where the classification attribute indicates "OFFICE" (YES in step S1210), the processing proceeds to step S1203. On the other hand, in a case where the classification attribute indicates "HOME" (NO in step S1210), the processing proceeds to step S1205.

Further, a plurality of printing apparatuses can be registered as a single virtual cloud printer (hereinafter, also referred to as "virtual cloud printer"), and the virtual cloud printer can be registered in an external CPS. In this case, only printing apparatuses having the same attribute such as office or home can form a virtual printer. For example, the printing processes of the plurality of printing apparatuses can be changed collectively by selecting the color MFPs 107, 1301, and 1302 and setting a virtual cloud printer "COLOR MFP SERIES FOR OFFICE".

In a case where the printing apparatuses under the virtual cloud printer are re-edited and capability information is updated, synchronization processing is performed to notify the change to the external CPS. This prevents inconsistencies in the print control of the virtual cloud printer.

MODIFIED EXAMPLES

While the cases where cloud printers corresponding to real printing apparatuses on a one-to-one basis or a virtual cloud printer including a plurality of printing apparatuses under the virtual cloud printer is registered in an external CPS and cooperates with the external CPS according to the first and second exemplary embodiment are described above as examples, aspects of the present disclosure are not limited to those described above. Further, the attributes according to the second exemplary embodiment are not limited to office and home described above, and the printing processes can be changed as suitable for each use form by increasing attributes at the time of the device registration.

Other Exemplary Embodiments

The scope of the present disclosure includes an apparatus or a system configured by combining the above-described exemplary embodiments as needed and a method therefor.

Embodiments of the present disclosure include an apparatus or a system that executes one or more pieces of software (program) for implementing the functions of the above-described exemplary embodiments. Further, a method for implementing the above-described exemplary embodiments that is performed by the apparatus or the system is also an aspect of the present disclosure. Further, the program or programs are supplied to the system or the apparatus via a network or various storage mediums, and one or more computers (CPUs or micro-processing units (MPUs)) of the system or the apparatus read the program or programs to one or more memories and execute the read program. In other words, aspects of the present disclosure include the programs or the various computer-readable storage mediums storing the programs. Further, embodiments of the present disclosure are implemented also by a circuit (e.g., ASIC) that realizes the functions of the above-described exemplary embodiments.

With an aspect of the present disclosure, even in a case where a printing apparatus does not support a specific cloud printing service, printing can be performed in a flexible manner by cooperating with another cloud printing service using a special printing method for the specific cloud printing service.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-184541, filed Nov. 12, 2021, which is hereby incorporated by reference herein in its entirety.

What is claimed is:

1. A first printing system configured to cooperate with a second printing system, the first printing system comprising:
   a storage; and
   one or more processors capable of executing instructions causing the first printing system to:
      manage print data for each user in the storage;
      receive a first request relating to printing by a first printing apparatus;
      transmit, to the first printing apparatus, first print data corresponding to a first user that is an issuer of the first request so that the first printing apparatus prints the first print data;
      receive a second request including configuration information about a second printing apparatus from a client terminal in which an application program for the first printing system has been installed, the configuration information indicating that the second printing apparatus does not support a polling mechanism for the first printing system; and
      transmit, based on the configuration information indicating that the second printing apparatus does not support the polling mechanism for the first printing system, to the second printing system managing the second printing apparatus corresponding to the configuration information, second print data corresponding to a second user that is an issuer of the second request so that the second printing apparatus specified by the configuration information prints the second print data to be received from the second printing system,
   wherein the second request is issued by the application program in response to an acquisition of the configuration information by the application program based on an operation for selecting the second printing apparatus using the client terminal by the second user.

2. The first printing system according to claim 1, wherein the instructions further cause the first printing system to specify, in a case where the second request is received, account information of the second user for the second printing system and address information for requesting printing,
   wherein the second print data is transmitted as a print request based on the specified account information to the second printing system using the specified address information.

3. The first printing system according to claim 1, wherein the instructions further cause the first printing system to update a record corresponding to the first user in a case where a notification indicating that printing based on the first print data is completed is received from the first printing apparatus.

4. The first printing system according to claim 3, wherein the instructions further cause the first printing system to update a record corresponding to the second user in a case where a notification indicating that printing by the second printing apparatus based on the second print data is completed is received from the second printing system.

5. The first printing system according to claim 1, wherein the instructions further cause the first printing system to delete, in a case where a notification indicating that printing by the second printing apparatus based on the second print data is completed is received from the second printing system, the second print data from the storage.

6. The first printing system according to claim 1, wherein the storage manages a print job transmitted from the second printing system.

7. A method of a first printing system configured to manage print data in a storage for each user and configured to cooperate with a second printing system, the method comprising:
   managing print data for each user in the storage;
   receiving a first request relating to printing by a first printing apparatus;
   transmitting, to the first printing apparatus, first print data corresponding to a first user that is an issuer of the first request so that the first printing apparatus prints the first print data;
   receiving a second request including configuration information about a second printing apparatus from a client terminal in which an application program for the first printing system has been installed, the configuration information indicating that the second printing apparatus does not support a polling mechanism for the first printing system; and
   transmitting, based on the configuration information indicating that the second printing apparatus does not support the polling mechanism for the first printing system, to the second printing system managing the second printing apparatus corresponding to the configuration information, second print data corresponding to a second user that is an issuer of the second request so that the second printing apparatus specified by the configuration information prints the second print data to be received from the second printing system,
   wherein the second request is issued by the application program in response to an acquisition of the configuration information by the application program based on an operation for selecting the second printing apparatus using the client terminal by the second user.

8. The first printing system according to claim 1, wherein the instructions further cause the first printing system to determine, based on the first request, that the first printing apparatus supports the polling mechanism for the first printing system,
   wherein the first printing system, based on determining that the first printing apparatus supports the polling mechanism for the first printing system, transmits the first print data to the first printing apparatus.

9. The first printing system according to claim 1, wherein the instructions further cause the first printing system to determine, based on the configuration information, that the second printing apparatus does not support the polling mechanism for the first printing system,
   wherein the first printing system, based on determining that the second printing apparatus does not support the polling mechanism for the first printing system, transmits the second print data to the second printing system.

10. The first printing system according to claim 1, wherein the second request including the configuration information is transmitted, by the application program on the client terminal, to the first printing system based on the client terminal scanning a quick response (QR) code.

11. The method according to claim 7, further comprising:
   specifying, in a case where the second request is received, account information of the second user for the second printing system and address information for requesting printing,
   wherein the second print data is transmitted as a print request based on the specified account information to the second printing system using the specified address information.

12. The method according to claim 7, further comprising:
   updating a record corresponding to the first user in a case where a notification indicating that printing based on the first print data is completed is received from the first printing apparatus.

13. The method according to claim 12, further comprising:
   updating a record corresponding to the second user in a case where a notification indicating that printing by the second printing apparatus based on the second print data is completed is received from the second printing system.

14. The method according to claim 7, further comprising:
   deleting, in a case where a notification indicating that printing by the second printing apparatus based on the second print data is completed is received from the second printing system, the second print data from the storage.

15. The method according to claim 7, wherein the managing the print data for each user in the storage includes managing a print job transmitted from the second printing system.

16. The method according to claim 7, further comprising:
   determining, based on the first request, that the first printing apparatus supports the polling mechanism for the first printing system,
   wherein the first printing system, based on determining that the first printing apparatus supports the polling mechanism for the first printing system, transmits the first print data to the first printing apparatus.

17. The method according to claim 7, further comprising:
   determining, based on the configuration information, that the second printing apparatus does not support the polling mechanism for the first printing system,
   wherein the first printing system, based on determining that the second printing apparatus does not support the polling mechanism for the first printing system, transmits the second print data to the second printing system.

18. The method according to claim 7, wherein the second request including the configuration information is transmitted, by the application program on the client terminal, to the first printing system based on the client terminal scanning a quick response (QR) code.

* * * * *